United States Patent
Du et al.

(10) Patent No.: US 9,083,977 B2
(45) Date of Patent: Jul. 14, 2015

(54) SYSTEM AND METHOD FOR RANDOMLY ACCESSING COMPRESSED DATA FROM MEMORY

(71) Applicant: OmniVision Technologies, Inc., Santa Clara, CA (US)

(72) Inventors: Xuanming Du, San Jose, CA (US); Christopher Shane Coffman, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 345 days.

(21) Appl. No.: 13/686,574

(22) Filed: Nov. 27, 2012

(65) Prior Publication Data

US 2014/0146872 A1    May 29, 2014

(51) Int. Cl.
    H04N 7/26       (2006.01)
    H04N 19/423     (2014.01)

(52) U.S. Cl.
    CPC .................................. *H04N 19/423* (2014.11)

(58) Field of Classification Search
    CPC .............................. H04N 19/423; H04N 19/70
    USPC ................................. 375/240.2; 382/232, 233
    See application file for complete search history.

(56) References Cited

U.S. PATENT DOCUMENTS

| 7,480,418 B2 | 1/2009 | Niemi et al. |
| 7,894,681 B2 | 2/2011 | Kaithakapuzha |
| 2006/0088221 A1* | 4/2006 | Henry et al. ............ 382/232 |
| 2009/0148057 A1* | 6/2009 | Chen et al. .............. 382/243 |
| 2014/0086309 A1* | 3/2014 | Beer-Gingold et al. . 375/240.02 |

* cited by examiner

*Primary Examiner* — Jay Patel
*Assistant Examiner* — Francis G Geroleo
(74) *Attorney, Agent, or Firm* — Larry E. Henneman, Jr.; Gregory P. Gibson; Henneman & Associates, PLC

(57) ABSTRACT

A method facilitating random access to segments of compressed data stored in memory includes the steps of receiving a series of data segments, encoding the series of data segments into a series of compressed data segments of variable segment sizes, storing the series of compressed data segments in a memory, and generating a locator for each of the compressed data segments. Each locator is indicative of the location of an associated compressed data segment in the memory. A method for randomly accessing a segment of compressed data includes receiving a request for a compressed data segment, retrieving a locator associated with the requested segment, using the retrieved locator to locate the requested segment in the memory, and retrieving the requested segment from the memory. Thus, compressed data segments can be decoded in a different order than the order they were encoded in. Systems for implementing the methods are also disclosed.

39 Claims, 13 Drawing Sheets

SYSTEM AND METHOD FOR RANDOMLY ACCESSING COMPRESSED DATA FROM MEMORY

BACKGROUND OF THE INVENTION

1. Field of the Invention

This invention relates generally to an encoder and decoder system ("codec") for compressing and decompressing data, and more particularly to a codec system that facilitates decoding segments of the compressed data independently and out of the order in which those segments were encoded.

2. Description of the Background Art

Demand for media (e.g., video, still images, etc.), especially high-definition (HD) media, has increased dramatically in recent years. Unfortunately, raw HD media contains very large amounts of data, which makes storing the raw data difficult. For example, storing a frame of raw HD video data requires a very large frame buffer. This is problematic when HD device developers are under pressure to reduce device sizes and costs.

Codecs are used to increase data compression in media devices. In a codec, the encoder receives the raw media data and encodes it into compressed data, which can be stored in memory for later retrieval. When the compressed data is retrieved from memory, it is sent to a decoder, which decodes the compressed data and outputs decoded media data for playback.

Codecs, however, introduce problems of their own. For example, popular image codecs (e.g., JPEG codecs, etc.) introduce data dependencies into the compressed data. As a result, the compressed data defining an image must be decoded in the same order in which it was encoded (i.e., in a first-in-first-out manner). This has the effect that a portion of the decoded image cannot be decoded and accessed without decoding the compressed data that was encoded before it. Codecs also suffer the disadvantage that they require detailed configuration information, for example a frame header, to be stored with the compressed data and transferred between the encoder and decoder. However, transmitting and storing the configuration information is a disadvantage because it increases both the amount of memory needed to store the compressed data and the amount of data that needs to be communicated within the media device.

What is needed, therefore, is a system and method that facilitates independent and selective access to segments of compressed data. What is also needed is a system and method that facilitates decoding segments of compressed data in a different order than they were encoded in. What is also needed is a system and method for compressing data that does not create data dependencies within the compressed data. What is also needed is a system and method that eliminates the need to transfer configuration information between the encoder and decoder.

SUMMARY

The present invention overcomes the problems associated with the prior art, by providing a system and method that facilitates randomly accessing segments of compressed data stored in a memory. The invention facilitates compressing segments of data without introducing data dependencies between compressed data segments. The invention also facilitates generating locators that indicate the locations associated compressed data segments in memory. As a result, any of the compressed data segments can be retrieved from memory and decoded in any order, without requiring other compressed data segments to also be decoded.

A method according to the present invention facilitates random access to segments of compressed data stored in memory. The method includes the steps of receiving a series of data segments, encoding the series of data segments into a series of compressed data segments having variable segment sizes, storing the series of compressed data segments in a compressed data memory, optionally free of header information, and generating a locator for each of the compressed data segments. Each locator is indicative of the location of an associated compressed data segment in the compressed data memory. Particular methods can also include the steps of determining the size of each of the compressed data segments in the series and/or storing the locators in a locator memory for later retrieval.

According to a particular method, the locator includes a memory address identifying a memory location in the compressed data memory storing at least part of the associated compressed data segment and an offset that identifies the position of the first bit of the associated compressed data segment within the identified memory location. In a more particular method, a locator for an associated compressed data segment is generated by calculating a sum of the sizes of each of the compressed data segments stored prior to the associated compressed data segment, dividing the sum by a value equal to the width of the compressed data memory to obtain a quotient and a remainder, converting the quotient to the memory address of the locator, and setting the offset of the locator equal to the remainder. According to another particular method, the locator can be a memory pointer.

According to a particular method, the series of data segments comprises a series of blocks of image data defining an image, and the compressed data memory is a frame buffer. According to such a method, the step of encoding the data segments can include performing a discrete cosine transform (DCT) on each block of image data to generate a series of blocks of absolute DCT coefficients, which are DCT coefficients that are generated without reference to any other block of DCT coefficients. The step of encoding can also include, for each block of DCT coefficients, the steps of quantizing the block of DCT coefficients to produce a block of quantized coefficients, zig-zag encoding the block of quantized coefficients into a sequence of quantized coefficients, run-length-encoding the sequence of quantized coefficients to produce run-length-encoded data (RLE) data, and entropy encoding the RLE data to produce one of the series of compressed data segments. Optionally, the quantization data and entropy data used during the steps of quantization and entropy encoding does not change between images.

A method for randomly accessing a compressed data segment from the compressed data memory is also disclosed. One method of the invention includes the steps of receiving a request for a compressed data segment, retrieving a locator associated with the requested compressed data segment, using the retrieved locator to locate the requested compressed data segment within the series of compressed data segments stored in the compressed data memory, and retrieving the requested compressed data segment. A particular method further includes the steps of retrieving a second locator associated with a second compressed data segment stored in the compressed data memory after the requested compressed data segment, and using the second locator to locate and end of the requested compressed data segment.

Another particular method includes the step of decoding the compressed data. Thus, the invention enables a compressed data segment to be retrieved and decoded out of order with the rest of the series of compressed data segments. In the case of an image, the step of decoding the compressed data segment can include the steps of entropy decoding the requested compressed data segment to produce RLE data, run-length decoding the RLE data to produce a plurality of quantized coefficients, performing an inverse zig-zag process on the plurality of quantized coefficients to produce a block of quantized coefficients, dequantizing the block of quantized coefficients to produce a block of absolute DCT coefficients, and performing an inverse DCT process on the block of absolute DCT coefficients without reference to any other block of DCT coefficients to produce a block of decoded image data. According to a more particular method, the step of decoding can be performed without parsing a header associated with the series of compressed data segments.

Non-transitory, electronically-readable storage medium having code embodied therein for causing an electronic device to perform the above methods of the invention are also described. The term "non-transitory" is intended to distinguish storage media from transitory electrical signals. However, re-writable memories are intended to be "non-transitory".

The present invention also describes systems facilitating random access to segments of compressed data stored in a compressed data memory. According to one embodiment, the system includes a data input coupled to receive a series of data segments, an encoder operative to encode the series of data segments into a series of compressed data segments having variable segment sizes, a compressed data memory coupled to receive and store the series of compressed data segments, and a locator generator operative to generate a locator for each of the series of compressed data segments, where the locator is indicative of the location of an associated compressed data segment in the series.

Particular embodiments of the encoder of the present invention can be implemented to perform any of the particular encoding methods described above, particularly with respect to the absolute DCT-, quantization-, zig-zag-, run-length-, and entropy-encoding processes for encoding blocks of image data into compressed data segments. Particular embodiments of the locator generate of the present invention can also be implemented to generate locators according to the above-described methods, particularly with respect to determining the sizes of the compressed data segments and using the sizes to generate the locators. Furthermore, any of the above-described formats for the locators can also be implemented in particular embodiments of the present invention.

A system for randomly accessing a segment of compressed data from memory is also disclosed. According to one embodiment, the system includes a data request input operative to receive a request for at least one compressed data segment selected from a series of variable-size compressed data segments stored in the compressed data memory. The embodiment also includes a controller that is operative to retrieve a locator associated with the requested compressed data segment, to use the retrieved locator to locate the requested compressed data segment in the compressed data memory, and to retrieve the requested compressed data segment from memory. In a more particular embodiment, the controller can also retrieve a second locator associated with a second compressed data segment stored in the compressed data memory and then use the second locator to locate the end of the requested compressed data segment.

The system can also include a decoder operative to decode the requested compressed data segments. In a particular embodiment, the decoder can use inverse entropy, inverse run-length, inverse zig-zag, inverse quantization, and inverse DCT processes to decode the compressed data segment. In another particular embodiment, the decoder can decode the requested compressed data segment without parsing a compressed data header.

A data structure for a locator for locating an associated compressed data segment in memory is also disclosed. The data structure can be stored in a non-transitory, electronically-readable storage medium. In a particular embodiment, the data structure includes a first field storing data defining a memory address identifying a memory location in the memory in which at least a portion of the associated compressed data segment is stored. The data structure also includes a second field storing data defining an offset, where the offset is indicative of a bit position within the memory location where the associated compressed data segment begins. In a more particular embodiment, the data structure further includes a third field storing data uniquely identifying the associated compressed data segment from a plurality of other compressed data segments.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a system and method that facilitates randomly accessing segments of compressed data stored in a memory. In the following description, numerous specific details are set forth (e.g., particular routines and components for generating locators, data trimming practices, etc.) in order to provide a thorough understanding of the invention. Those skilled in the art will recognize, however, that the invention may be practiced apart from these specific details. In other instances, details of well-known data compression practices (e.g., particular encoding and decoding techniques, routine optimization) and components have been omitted, so as not to unnecessarily obscure the present invention.

Figure 1:
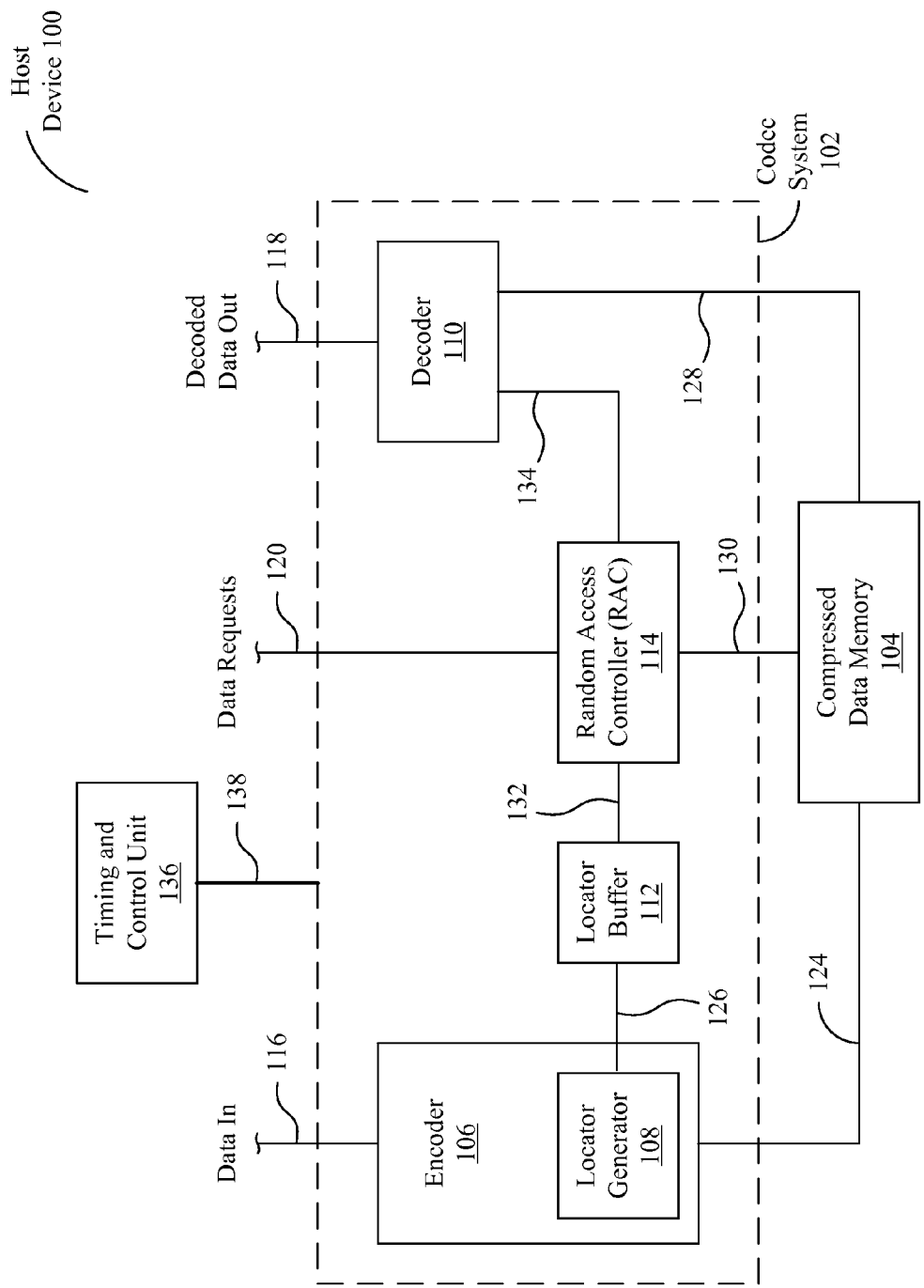
FIG. 1 is a block diagram of a host device that includes an encoder and decoder (codec) system according to one embodiment of the present invention.

FIG. 1 is a block diagram of a host device 100 that includes an encoder and decoder (codec) system 102 according to one embodiment of the present invention. Codec system 102, among other advantages, facilitates randomly accessing segments of compressed data stored in a compressed data memory 104. Codec system 102 includes an encoder 106 including a locator generator 108, a decoder 110, a locator buffer 112, and a random access controller (RAC) 114. Uncompressed data is provided to codec system 102 via a data input 116, and decoded data is provided from codec system 102 via a decoded data output 118. Data requests to randomly access segments of compressed data from compressed data memory 104 are provided from host device 100 via data request input 120.

Host device 100 represents any system or device that would benefit from the ability to encode (compress) data, decode (decompress) data, and/or randomly retrieve and decode the segments of compressed data stored in compressed data memory 104. In the present embodiment, host device 100 is an image processor and codec system 102 facilitates randomly accessing segments of a compressed image (e.g., a compressed frame of video) stored in compressed data memory 104. Host device 100 can be implemented, for example, in integrated circuitry, software, etc. and/or any combination thereof.

The components of codec system 102 operate as follows. Encoder 106 receives a series of uncompressed data segments via data input 116, encodes the series of data segments into a series of compressed data segments, and provides the series of compressed data segments to compressed data memory 104 via data path 124. As will be described in more detail below, encoder 106 provides a means for encoding each of the data segments independently of any other of the compressed data segments. In one embodiment, encoder 106 is similar to a Joint Photographic Experts Group (JPEG) encoder but is not constrained by the JPEG compression standard or its associated file formats (e.g., JIF, Exif, JFIF, etc.).

Encoder 106 includes a locator generator 108 that generates a locator for each of the compressed data segments in the series. Each locator advantageously indicates a location in the compressed data memory 104 where an associated compressed data segment is stored. Locator generator 108 stores a locator for each of the series of compressed data segment in the locator buffer 112 via data path 126. Thus, locator generator 108 and the generated locators are means for locating the compressed data segments in the compressed data memory. While locator generator 108 is shown incorporated in encoder 106 in FIG. 1, locator generator 108 can alternatively be embodied outside of encoder 106.

Compressed data memory 104 receives the series of compressed data segments from encoder 106 via data path 124 and stores each of the compressed data segments therein. Decoder 110 can read compressed data segments directly from compressed data memory 104 via data path 128 (e.g., when decompressing a whole image). Additionally, RAC 114 can read compressed data segments from compressed data memory 104 via data path 130 in any order, (e.g., when decompressing only portions of an image), and provide those to compressed data segments to decoder 110 via data path 134.

In the present embodiment of the invention, compressed data memory 104 is a frame buffer adapted to contiguously store a series of compressed data segments associated with an image (e.g., a frame of video) in a plurality of memory locations. Compressed data memory 104 can be implemented within host device 100 or, alternatively, can be a memory external to host device 100. As another example, compressed data memory 104 can be a memory dedicated to codec system 102.

Locator buffer 112 receives and stores the locators from encoder 106 via data path 126. Each locator is stored in locator buffer 112 such that it can be associated with the corresponding compressed data segment. Locator buffer 112 also provides locators to RAC 114 via data path 132 when requested by RAC 114. While locator buffer 112 is shown as being a memory within codec system 102, it should be understood that locator buffer 112 can be implemented anywhere in host device 100 or even externally to host device 100.

RAC 114 utilizes the locators in locator buffer 112 to retrieve one or more compressed data segments from compressed data memory 104 and to provide those compressed data segments to decoder 110 in any order indicated by the data requests received on data request input 120. In particular, RAC 114 receives requests for data segments via data request input 120 from host device 100. RAC 114 retrieves locators for the requested data segments via data path 132 and then reads the requested compressed data segments from compressed data memory 104 via data path 130. RAC 114 then provides the one or more requested compressed data segments to decoder 110 for decoding via data path 134. As indicated above, host device 100 can request data segments in any desired sequence, and RAC 114 will read the corresponding compressed data segments from compressed data memory 104 and decoded according to that sequence.

Decoder 110 receives compressed data segments from compressed data memory 104 and RAC 114 via data paths 128 and 134, respectively, and decodes those compressed data segments. Decoder 110 then provides decoded data segments via decoded data output 118 to host device 100 for further use as requested by host device 100. As will be described more below, in one embodiment decoder 110 is similar to a JPEG decoder but is not constrained by the JPEG compression standard and its associated file formats.

FIG. 1 also shows that host device 102 includes a timing and control unit 136, which provides timing and other control signals (e.g., clock pulses, enable signals, reset signals, etc.) to the elements of codec system 102 and compressed data memory 104 via a timing and control path 138. The timing and other control signals provided by timing and control unit 136 enable codec system 102 and compressed data memory 104 to carry out their intended functions and to move data through codec system 102 and compressed data memory 104 at the appropriate times and in the appropriate orders.

Timing and control unit 136 and timing and control path 138 are shown representationally. However, those skilled in the art will realize that timing and control unit 136 and timing and control path 138 can be implemented in various ways (e.g., separate units and busses for timing signals and control signals, separate units for host device 100 and codec system 102, etc.). Additionally, timing and control elements can also be implemented inside codec system 102.

Figure 2:
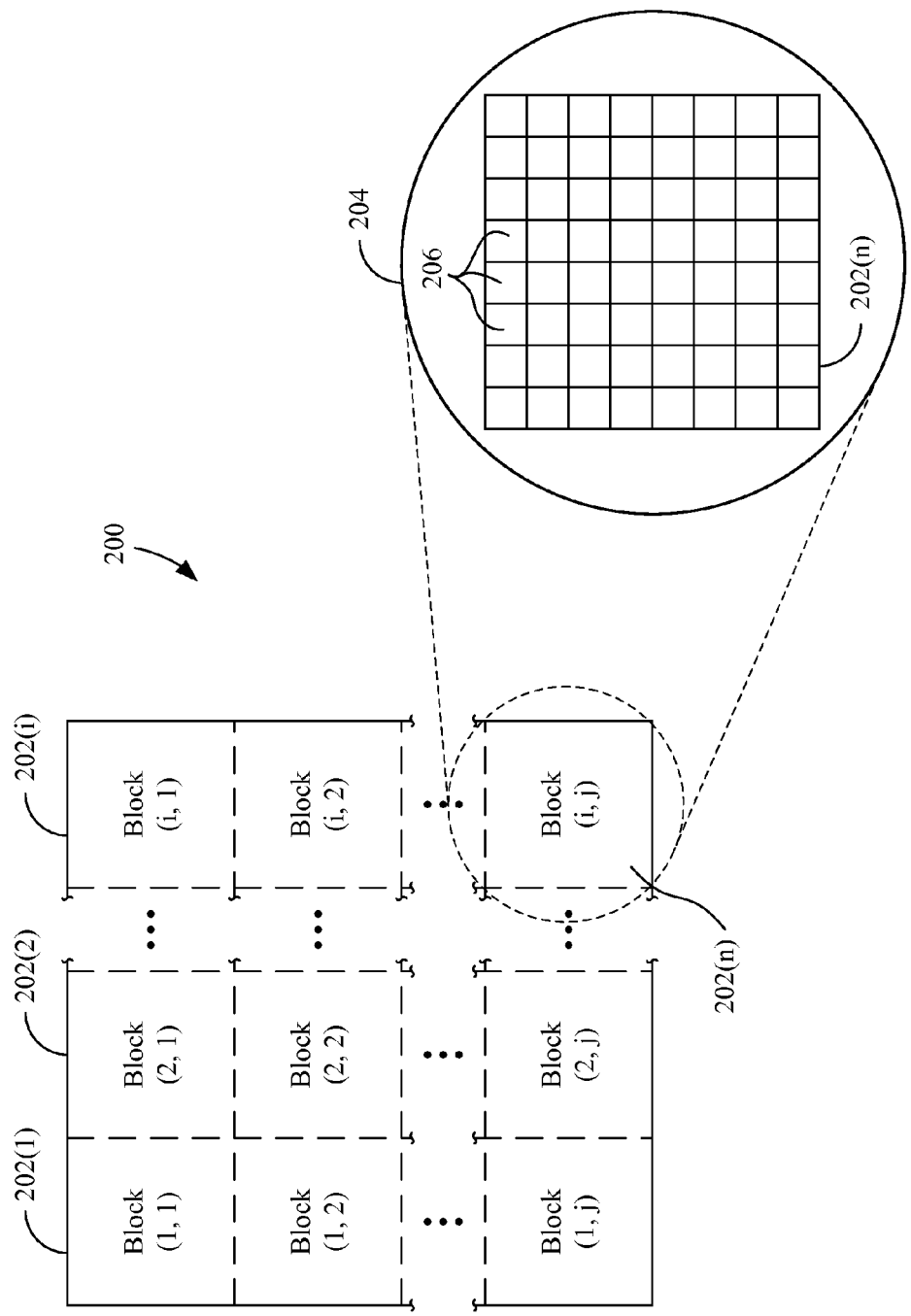
FIG. 2 is a diagram illustrating how an image can be divided into a plurality of data segments according to the present invention.

FIG. 2 is a diagram illustrating how an image 200 (e.g., a frame of video) can be divided into a plurality of data segments 202(1)-202(n). As shown in detail 204, each data segment 202(1)-202(n) includes image data for an 8-by-8 block of pixels 206 of the image 200. Therefore, if image 200 has 1280×720 pixels, it can be divided into 160×90 (i.e., 14,400) blocks of image data, with each block 202(1)-202(14400) defining a uniform amount of pixel data.

In the present embodiment, host device 100 is responsible for dividing each image 200 into an array of data segments 202(1)-202(n) (hereinafter, referred to as blocks 202(1)-202(n)) and providing the blocks 202(1)-202(n) as a series to data input 116 of codec system 102. Host device 100 also provides the series of blocks 202(1)-202(n) to codec system 102 in a predetermined sequence known to the host device 100 and to the components of codec system 102. In the present embodiment, host device 100 provides the blocks 202(1)-202(n) in a sequence beginning with block 202(1) in the top left of the array, moving to the end of the first row, and then moving row-by-row down the array, ending with block 202(n) in the bottom right of the array. Thus, for the array shown in FIG. 2, the sequence would be blocks 202(1, 1), 202(2, 1), ... 202(i, 1), 202(1, 2), 202(2, 2), ... 202(i, 2), ... 202(1, j), 202(2, j), ... and ending with block 202(i, j).

In the present embodiment, host device 100 can also format each image 200 for compatibility with codec system 102. For example, host device 100 can convert an image from one color space (e.g., Red, Green, Blue (RGB), etc.) into another color space (e.g., YCbCr, etc.). Additionally, host device 100 can also separate an image into its color space components (e.g., Y, Cb, Cr; etc.), such that multiple images 200 are generated for each composite image. In such a case, each image 200 would include data for only one of the color space components of the composite image. These and other block preparation techniques are available to host device 100.

While host device 200 is responsible for block preparation in the present embodiment prior to providing image data to encoder 106, it will be appreciated that encoder 106 could also prepare the series of blocks 202(1)-202(n) for encoding.

Figure 3:
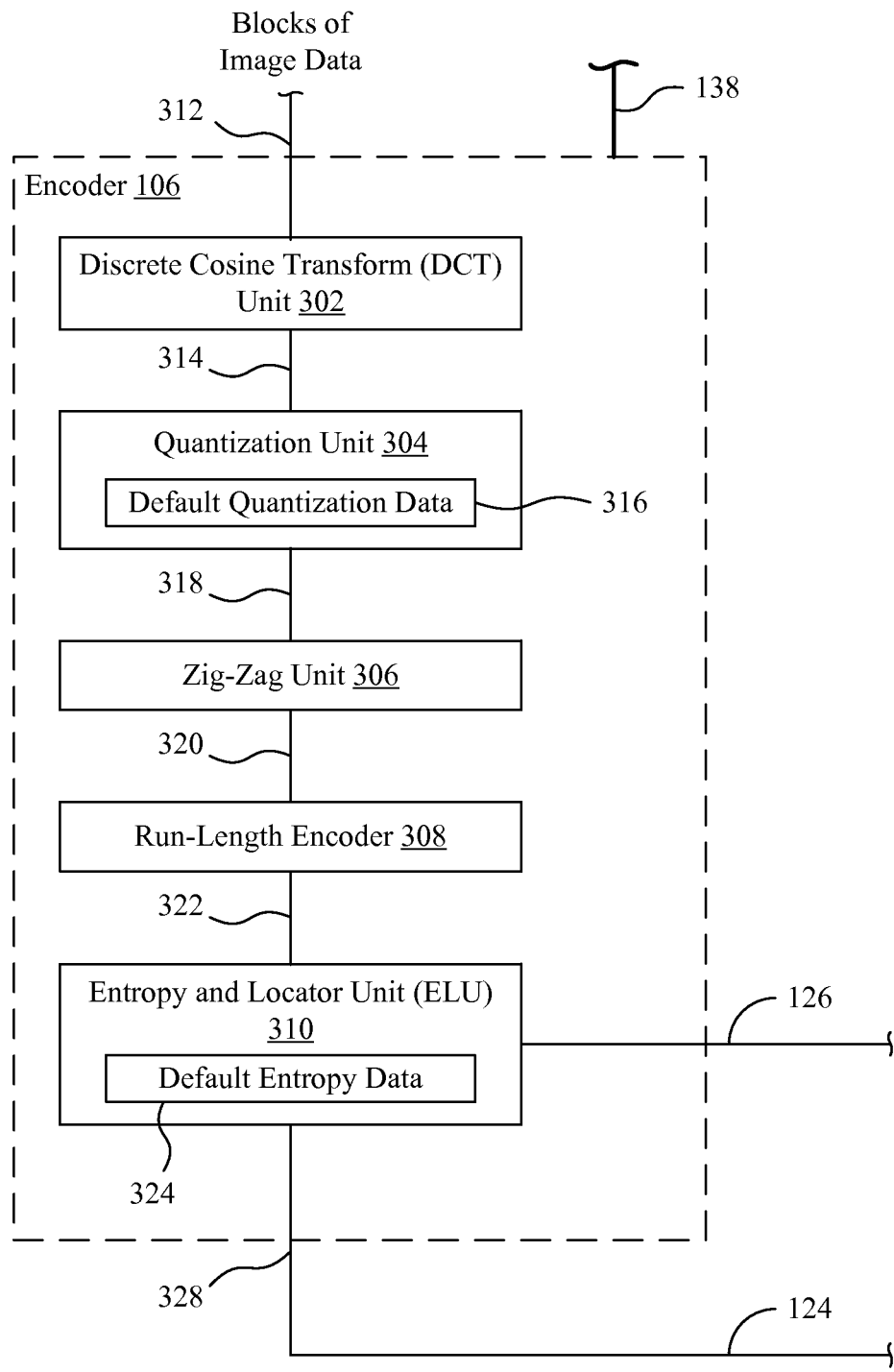
FIG. 3 is a block diagram showing the encoder of FIG. 1 in greater detail, according to one embodiment of the present invention.

FIG. 3 is a block diagram showing encoder 106 of FIG. 1 in greater detail, according to one embodiment of the present invention. Encoder 106 includes a Discrete Cosine Transform (DCT) unit 302, a quantization unit 304, a zig-zag unit 306, a run-length encoder 308, and an entropy and locator unit (ELU) 310.

Encoder 106 sequentially receives a series of blocks 202(1)-202(n) of uncompressed (raw) image data on an encoder input path 312 from host device 100 according to the predetermined sequence discussed above. Encoder 106 receives and encodes each block 202(1)-202(n) in the series as follows.

DCT unit 302 receives each block 202(1)-202(n) of image data and performs an absolute DCT on the block 202, whereby the block 202 of image data is transformed into an 8-by-8 block of 64 DCT coefficients in the frequency domain. As will be described in more detail below, the DCT is performed such that all of the DCT coefficients in the block are absolute values. Because all of the DCT coefficients in each block of DCT coefficients are absolute values, there are no block-to-block data dependencies introduced into the series of compressed data segments generated by encoder 106. Thus, DCT unit 302 can be considered an absolute DCT unit 302, which performs an absolute DCT on each block 202 of image data. DCT unit 302 provides each resulting block of DCT coefficients to quantization unit 304 via data path 314.

Quantization unit 304 receives each block of absolute DCT coefficients and quantizes the block of DCT coefficients using default quantization data 316 to produce an 8-by-8 block of quantized coefficients. In the present embodiment, default quantization data 316 is a default quantization table, but could alternatively include a default quantization value used to quantize all DCT coefficients. Quantization unit 304 quantizes the block of DCT coefficients by dividing each DCT coefficient by a corresponding quantization value in the default quantization table 316 and then rounding the quotient to the nearest integer.

It should be noted that default quantization data 316 can be stored inside or outside of encoder 106. For example, default quantization data 316 can be stored in a memory external to encoder 106 accessible by quantization unit 304. Alternatively, default quantization data 316 can be defined in the integrated circuitry of encoder 106.

Using the default quantization data 316 to quantize the blocks of DCT coefficients over multiple images 200 provides important advantages. First, because default quantization data 316 does not have to change, quantization data does not have to be provided in a header to decoder 110 to configure the inverse quantization process. Rather, the decoder 110 can be programmed to use the same default quantization data as encoder 106 over multiple images/frames. Moreover, because a header is not needed to transfer the quantization data to decoder 110, the header can be eliminated instead of being stored with the compressed data in compressed data memory 104, which increases data compression and reduces data transfer times.

After quantization, quantization unit 304 provides each block of quantized coefficients to zig-zag unit 306 via data path 318. Zig-zag unit 306 receives each block of quantized coefficients from quantization unit 304 and performs a "zig-zag" operation on the block. The zig-zag operation arranges the block of quantized coefficients into a linear sequence by "zig-zagging" along the diagonals of the block, as is known in the art. For each block of quantized coefficients, zig-zag unit 306 outputs a linear sequence of quantized coefficients to run-length encoder 308 via data path 320.

Run-length encoder 308 receives a linear sequence of quantized coefficients associated with the block 202 from zig-zag unit 306 and encodes the linear sequence into run-length-encoded (RLE) data associated with the block. Run-length encoding is a well-known form of data compression in which runs of data having the same value (e.g., zero) are stored as a count. A particular method for run-length encoding stores the plurality of quantized coefficients associated with the block 202 of image data as pairs of values, each pair having a first value defining a run of zeros and a second value indicating the next non-zero quantized coefficient. The method also includes using an end-of-block (EOB) code to indicate that all remaining quantized coefficients associated with the block 202 have a value of zero. Once the RLE data is generated, it is provided to ELU 310 via data path 322.

ELU 310 receives the RLE data associated the block 202 and entropy encodes it into entropy-encoded data (EED), thereby defining a compressed data segment associated with the block 202 of image data. In the entropy-encoding process, frequently-occurring RLE data is encoded using shorter codes and infrequently-occurring RLE data is encoded using longer codes. One type of entropy encoding is known in the art as Huffman encoding. Entropy codes used to encode the RLE data are stored as default entropy data 324 (e.g., a default entropy look-up table) that is available to ELU 310. Once entropy encoding is complete, ELU 310 provides the compressed data segment associated with the block 202 of image data to compressed data memory 104 via an encoder output path 328, and data path 124.

Like default quantization data 316, default entropy data 324 can be stored externally to encoder 106 so long as entropy encoder 310 has access to it. Moreover, default entropy data 324 provides the same advantages as default quantization data 316. In particular, because default entropy data 324 does not change between blocks 202(1)-202(n) or between images 200, entropy data (e.g., an entropy table) does not have to be provided in a header with the compressed data to decoder 110 to configure its inverse entropy process. Rather, decoder 110 will be programmed to use the same default entropy data 324 as encoder 106. Furthermore, header information containing entropy data also does not have to be stored in compressed data memory 104, thereby saving improving data compression and data transfer times.

In addition to being an entropy encoder, ELU 310 also provides the functionality of locator generator 108 (FIG. 1). For each compressed data segment associated with a block 202(1)-202(n), ELU 310 generates a locator indicating where that compressed data segment is stored in compressed data memory 104. Because the encoding process of encoder 106 yields a series of compressed data segments, wherein each compressed data segment has a variable segment size, the locators generated by ELU 310 advantageously facilitate locating and extracting any of the compressed data segments from compressed data memory 104. According to one embodiment of the invention, ELU 310 determines and utilizes the variable segment sizes of the compressed data segments to generate their associated locators. Once a locator is generated for a compressed data segment that is associated with the block 202 of image 200, ELU 310 stores the locator in locator buffer 112 (FIG. 1) via data path 126 and stores the compressed data segment associated with the block 202 in compressed data memory 104.

Thus, for a given image 200, encoder 106 generates a series of compressed data segments that are stored in compressed data memory 104, where each of the series of compressed data segments is associated with one of the blocks 202(1)-202(n) of image 200. Each of the series of compressed data segments is also associated with one of the locators generated by ELU 310 and stored in locator buffer 112. Thus, each of the locators stored in locator buffer 112 is also associated with one of blocks 202(1)-202(n) of image 200.

Figure 4:
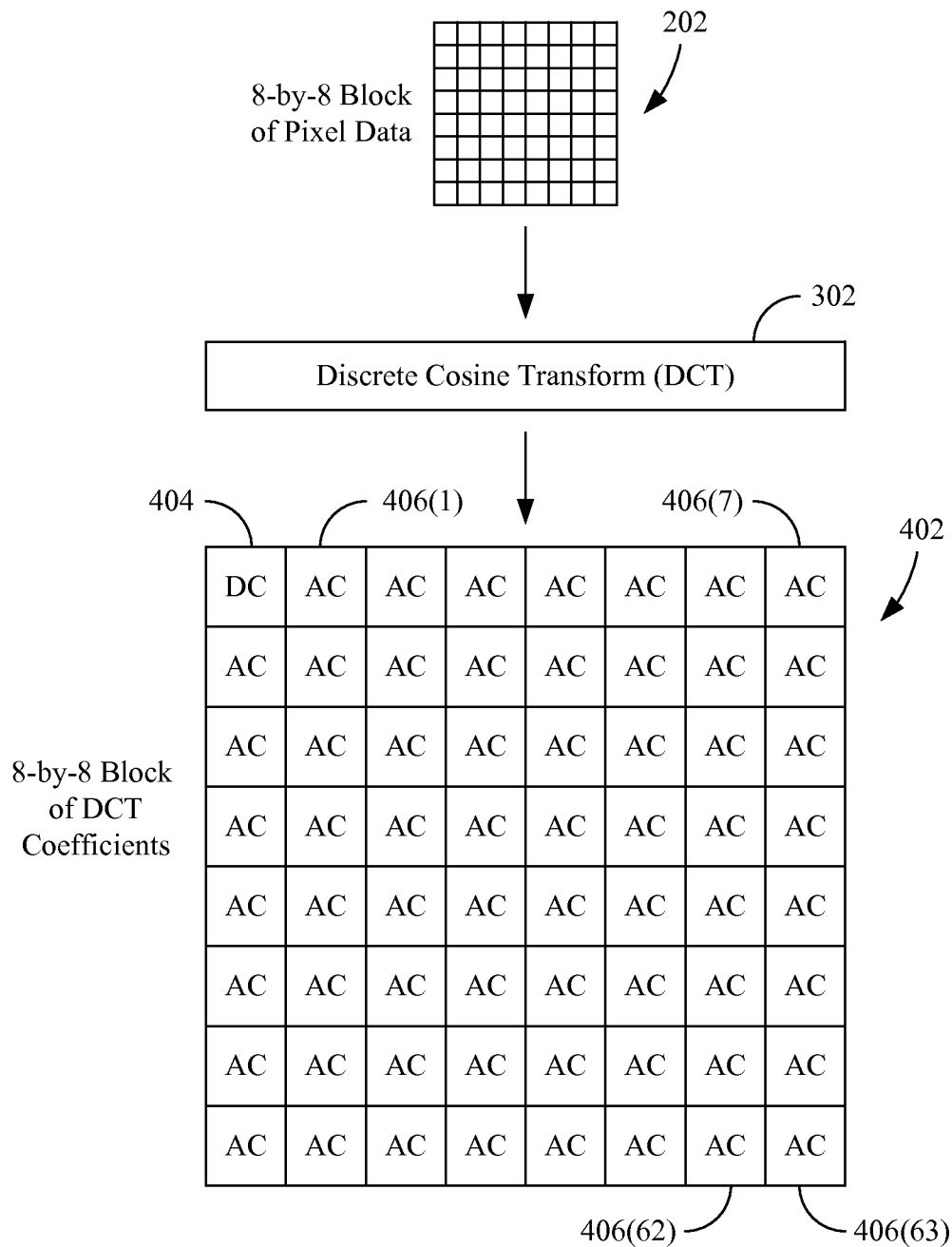
FIG. 4 is a diagram showing the Discrete Cosine Transform (DCT) unit of FIG. 3 performing a DCT on a block of image data according to the present invention.

FIG. 4 is a diagram showing DCT unit 302 of FIG. 3 performing a DCT on one of blocks 202(1)-202(n) of image data. As shown in FIG. 4, DCT unit 302 transforms each 8-by-8 block 202 of image data into an 8-by-8 block 402 of DCT coefficients in the frequency domain. Each block 402 of DCT coefficients includes one DC coefficient 404 and 63 AC coefficients 406(1)-406(63). As indicated above, the coefficients 404 and 406(1)-406(63) in each block 402 of DCT coefficients are absolute values, such that data dependencies are not introduced into the series of compressed data segments.

DCT processes are well-known in the art. The DCT process tends to aggregate large DCT coefficients in the top left of the block of DCT coefficients. Therefore, it is common for the absolute value of the DC coefficient to be quite large, especially compared to the absolute values of the AC coefficients.

In an effort to increase data compression, prior art encoders (e.g., JPEG encoders, etc.) encode the DC coefficient as the difference between the absolute DC coefficient for a current block and another value, such as the absolute DC coefficient of the previous block. This is process is commonly termed "prediction differencing". Encoding this difference rather than the absolute DC coefficient value results in better data compression, but it also has the drawback that it introduces data dependencies between consecutive blocks of DCT coefficients. As a result, a subsequent block of DCT coefficients in the prior art cannot be decoded without also decoding the previous block of DCT coefficients. Thus, the prior art is said to use a "relative" DCT encoding technique, which requires the prior art decoder to use a first-in-first-out decoding technique.

In contrast to the prior art, the DCT unit 302 of the present invention encodes an absolute value for the DC coefficient 404 (and for each of the AC coefficients 406(1)-406(63)) for each block 402 of DCT coefficients that it generates. Therefore, the values of the DCT coefficients in each block 402 are independent of the coefficient values in the other blocks 402 of DCT coefficients. While DCT unit 302 gives up some data compression (approximately 5% or less) due to the larger absolute DC coefficient 404, it has the advantage that no data dependencies are introduced into the blocks 402 of DCT coefficients. Thus, according to the invention, one compressed data segment can be randomly retrieved from compressed data memory 104 and decoded without having to retrieve and decode any other compressed data segments. Furthermore, any data compression lost by encoding the absolute DCT coefficient values is compensated for, because configuration data (e.g., a header with quantization and entropy data, etc.) is not stored in compressed data memory 104.

Figure 5:
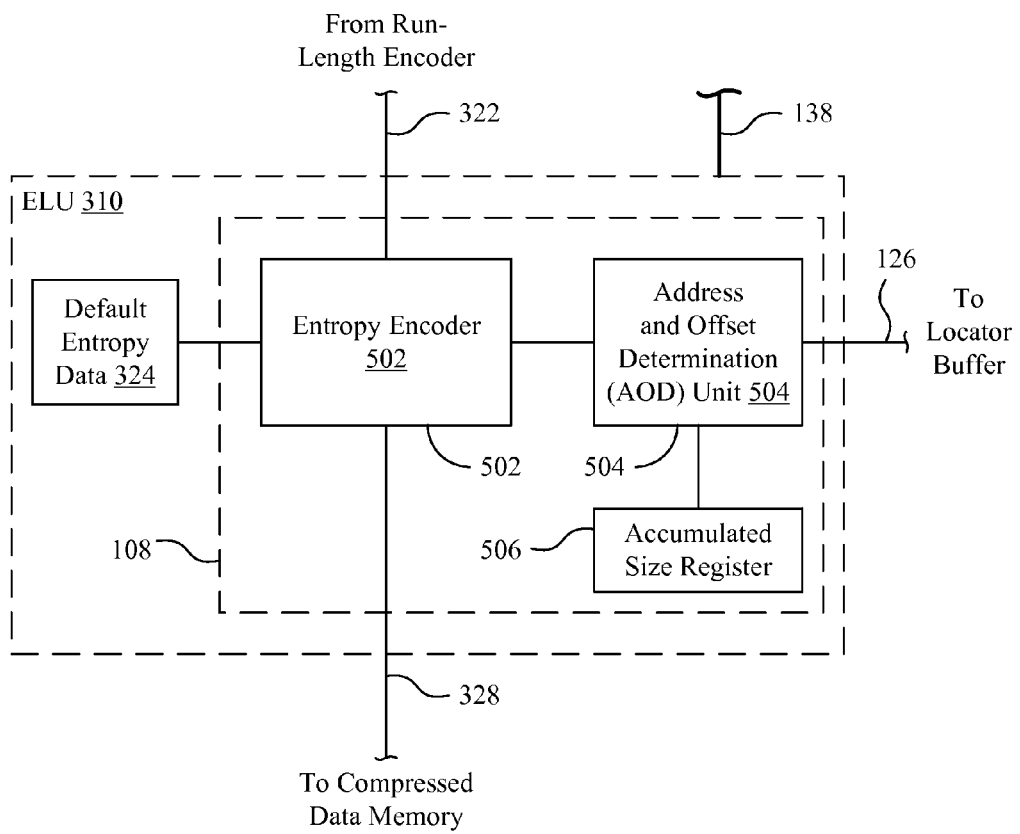
FIG. 5 is a block diagram showing the entropy and locator unit (ELU) of FIG. 3 in greater detail, according to one embodiment of the present invention.

FIG. 5 is a block diagram showing ELU 310 (FIG. 3) in greater detail, according to one embodiment of the invention. As shown in FIG. 5, ELU 310 includes an entropy encoder 502, an address and offset determination (AOD) unit 504, and an accumulated size register 506. In the present embodiment, entropy encoder 502, AOD unit 504, and accumulated size register 506 implement locator generator 108 (FIG. 1). FIG. 5 also shows that ELU 310 includes (or has access to) default entropy data 324.

Entropy encoder 502 receives RLE data associated with each block 202(1)-202(n) of image data via data path 322. For each block 202(1)-202(n), entropy encoder 502 encodes the RLE data with that block 202 into entropy-encoded data (EED) using the default entropy data 324. The EED represents a compressed data segment associated with the block 202, which will be stored in compressed data memory 104.

Entropy encoder 502 also determines the size of the compressed data segment associated with each block 202(1)-202(n), wherein the size represents the amount of memory the compressed data segment will occupy in compressed data store 104. Because the EED is serial data, the size of the compressed data segment can be expressed as a bit length of the compressed data segment. Entropy encoder 502 communicates the size (bit length) of the compressed data segment associated with each block 202(1)-202(n) to AOD unit 504 via data path 508. Entropy encoder 502 also provides the compressed data segment to compressed data store 104 via encoder output path 328.

AOD unit 504 generates a locator for each compressed data segment of an associated block 202, which can be used to locate and retrieve the compressed data segment from compressed data memory 104. In the present embodiment, AOD unit 504 determines a locator for each compressed data segment based on the accumulated size value stored in accumulated size register 506 and the width of compressed data memory 104. AOD unit 504 also stores locators in locator buffer 112 via data path 126. AOD unit 504 is also operative to accumulate the sizes of the compressed data segments by adding the size of each compressed data segment associated with an image 200 to accumulated size register 506.

Accumulated size register 506 stores the accumulated size of the compressed data segments associated with the blocks 202(1)-202(n) of image 200 as those blocks are encoded. Before an image 200 is encoded using encoder 106, accumulated size register 506 is reset, for example by a reset signal received on timing and control path 138. As entropy encoder 502 generates sizes for each successive compressed data segment, AOD 504 will accumulate the size values, segment-by-segment, in accumulated size register 506. Thus, for any given block 202(b) of the image 200 being encoded, accumulated size register 506 stores the total size of the compressed data segments associated with all previously-encoded blocks 202(1)-202(b-1) of the image 200.

Figure 6:
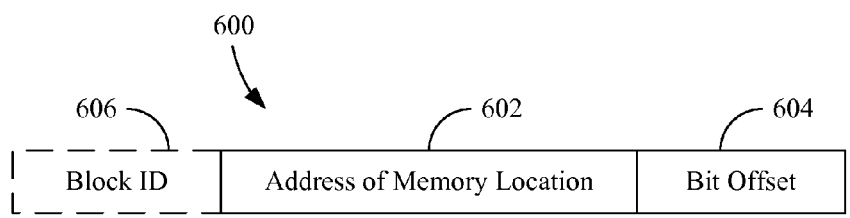
FIG. 6 shows a data structure for a locator, according to one embodiment of the present invention.

FIG. 6 shows a data structure for each locator 600 generated by AOD unit 504, according to one embodiment of the present invention. As shown, each locator 600 includes a first field 602, a second field 604, and an optional third field 606.

First field 602 contains data identifying a memory location (e.g., a memory address) within compressed data memory 104 where the compressed data segment associated with the locator 600 begins. In the present embodiment, compressed data memory 104 is a 64-bit wide frame buffer. Accordingly, first field 602 contains a memory address that identifies a 64-bit wide memory location in compressed data memory 104. The number of bits needed to define the memory addresses stored in first field 602 will depend on the size of compressed data memory 104.

Second field 604 contains data identifying a bit offset from the beginning of the memory location identified by the memory address in first field 602. In the present embodiment, the bit offset indicates the number of bits of data starting from the beginning of the memory location that are not part of the compressed data segment associated with the locator 600. The compressed data segment associated with the locator 600, therefore, begins with the bit following a number of bits in the memory location equal to the bit offset. The number of bits used in the second field 64 to define the bit offset will depend on the width of the memory locations in compressed data memory 104. For 64-bit wide memory locations, second field 604 can be defined using six bits of data.

Third field 606 includes data associating locator 600 with one of blocks 202(1)-202(n) of image 200. For example, each block 202(1)-202(n) in image 200 could be assigned a unique identifier, which is provided in third field 606 when the locator 600 is generated. The identifier 600 could then be used by RAC 114 to retrieve the locator. In the present embodiment, however, third field 606 is optional because the locators 600 can be stored in consecutive memory locations in locator buffer 112 in the same predetermined sequence in which the blocks 202(1)-202(n) are encoded.

AOD 504 generates each locator 600 as follows. For each compressed data segment, AOD 504 calculates the sum of the sizes of all the previous compressed data segments generated for image 200. In the embodiment shown in FIG. 5, AOD 504 obtains this sum by reading the value stored in accumulated size register 506. AOD 504 then divides this sum by the width (64 bits in the present embodiment) of compressed data memory 104 to obtain a quotient and a remainder, both expressed as integers. AOD 504 then converts (e.g., via a lookup table, etc.) the quotient to an address of a memory location in compressed data memory 104. This memory location is where the compressed data segment will begin in compressed data memory 104. AOD 504 then generates the locator 600 using the resulting memory address as field 602 and the remainder as the bit offset in field 604. Once the locator 600 for the current compressed data segment is generated, AOD 504 adds the size of the current compressed data segment (previously obtained from entropy encoder 502) to the accumulated value stored in the accumulated size register 506, such that the accumulated size value is updated to generate the locator 600 associated with the next compressed data segment.

AOD 504 can also generate locators 600 with the optional third field 606, for example, by counting the number of times entropy encoder 502 provides it with a size value. AOD 504 can then use this count value to supply third field 606 with a value that associates the locator 600 with a particular block 202 of image data. In such a case, the count value used by AOD 504 would be reset each time a new image 200 is encoded, for example by a reset signal received via timing and control path 138.

AOD 504 can also be operative to generate an optional "end locator" (FIG. 7) that indicates the end of the compressed data segment associated with the last block 202(n) of the image 200 within compressed data memory 104. The end locator provides the advantage that it enables RAC 114 to locate the end of this compressed data segment and "trim" any data that is not part of it before providing the compressed data segment to decoder 110. AOD 504 generates the end locator after the locator 600 associated with the last block 202(n) is generated and before a next image 200 is encoded. The end locator can include the same fields as the locators 600. AOD 504, for example, can generate the end locator using the accumulated size value for the compressed data segments associated with all of blocks 202(1)-202(n) stored in accumulated size register 506 and the algorithms described above for generating fields 602 and 604. Additionally, AOD 504 can provide the end locator with a third field that uniquely identifies the end locator.

Figure 7:
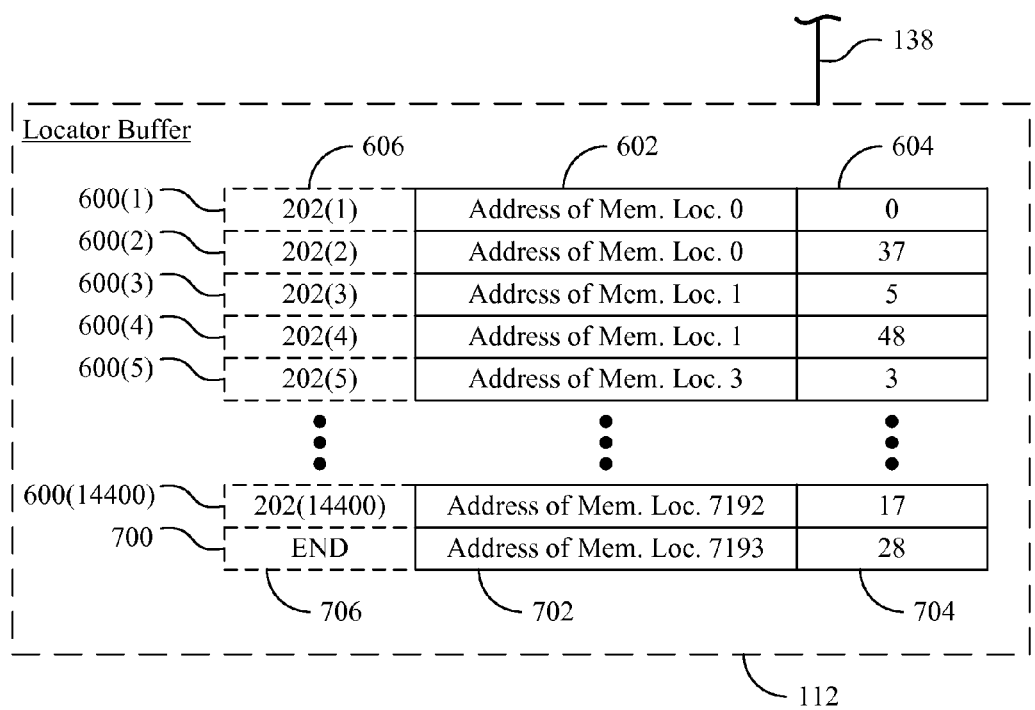
FIG. 7 shows the locator buffer of FIG. 1 storing a plurality of locators according to one embodiment of the present invention.

FIG. 7 shows a data structure for locator buffer 112 (FIG. 1) for storing a plurality of locators 600(1)-600(14400) associated with a 1280×720 image 200, according to the present invention. Locators 600(1)-(14400) locate the compressed data segments associated with blocks 202(1)-202(14400) of the image 200, respectively, in compressed data memory 104. Locator buffer 112 is also configured to store an end locator 700, as shown.

In the present embodiment, a 1280×720 image is the largest image that host device 100 and codec system 102 process. Therefore, locator buffer 112 includes sufficient memory to store locators for any image up to 1280×720 pixels in size. Those skilled in the art will realize that the number of locators 600 that locator buffer 112 should be able to store will vary with the resolution of the images to be compressed.

In the present embodiment, locator buffer 112 sequentially receives and stores locators 600(1)-600(14400) from encoder 106 in consecutive memory locations, beginning with a predetermined memory location. Thus, the locator 600(1) associated with block 202(1) is stored in a first memory location, the locator 600(2) associated with block 202(2) is stored in a second memory location, and so on until the last locator 600(14400) associated with the last block 202(14400) is stored. An end locator 700 is then stored after the last locator 600(14400) as shown. Because blocks 202(1)-202(14400) are supplied to encoder 106 in a known predetermined order, the locators 600(1)-600(14400) are generated and stored in the same known, predetermined order. Therefore, the locator 600 associated with any particular block 202 of the image 200 can be readily identified and retrieved from locator memory 112 by RAC 114. Accordingly, the third field 606 of the locators 600(1)-600(14400) is optional in the present embodiment. However, the third field 606 could otherwise facilitate identifying a particular locator 600 as being associated with a particular block 202 if the locators 600 were stored at random locations in locator buffer 112.

It should also be noted that the memory locations of locator buffer 112 can be reset between the encoding of consecutive images 200 (e.g., via a reset signal received via timing and control path 138), or at other predetermined times. Resetting the locator buffer 112 for each image would ensure that the locators 600 stored therein did not become corrupted, for example, if the resolution of successive encoded images changed.

FIG. 7 shows locators 600(1)-600(5), and 600(14400), and end locator 700 for hypothetical compressed data segments associated with blocks 202(1)-202(5) and 202(14400) of an image 200. For the following explanation, it will be assumed that the sizes (data length) of the compressed data segments associated with blocks 202(1)-202(4) and 202(14400) are 37 bits, 32 bits, 43 bits, 83 bits, and 75 bits, respectively.

For the first block 202(1), the first field 602 of locator 600(1) indicates that the compressed data segment associated with the first block 202(1) of image 200 begins in memory location zero of compressed data memory 104. The second field 604 of locator 600(1) further indicates that the compressed data segment associated with block 202(1) begins with the first bit in memory location zero, because the bit offset is zero. Because the compressed data segment associated with block 202(1) is 37 bits long, it occupies the first 37 bits of memory location zero. AOD 504 generated locator 600(1) by dividing the sum of the bit lengths of the previously-compressed data segments for image 200 (in this case zero) by 64 (the width of the memory locations in compressed data memory 104), to obtain the resulting quotient of zero and remainder of zero. This quotient was then converted to the address for memory location zero and stored in first field 602, and the remainder was stored as the bit offset in second field 604.

Locator 600(2) indicates that the compressed data segment associated with the second block 202(2) of image 200 begins in memory location zero (first field 602) after the $37^{th}$ bit (second field 604). (Recall the first 37 bits are occupied by the compressed data segment associated with the first block 202 (1).) AOD 504 generated locator 600(2) by dividing the sum of the bit lengths of the previously-compressed data segments for image 200 (in this case the sum is 37, which is stored in accumulated size register 506) by 64, to obtain the resulting quotient of zero and the remainder of 37. This quotient is then converted to the address for memory location zero and stored in first field 602, and the remainder is stored as the bit offset in second field 604.

Locator 600(3) indicates that the compressed data segment associated with the third block 202(3) of image 200 begins in memory location one (first field 602) after the fifth bit (second field 604). (The first five bits are occupied by the compressed data segment associated with the second block 202(2).) AOD 504 generated locator 600(3) by dividing the sum of the bit lengths of the previously-compressed data segments for image 200 (in this case the sum of 37 bits+32 bits, which is stored in accumulated size register 506) by 64, to obtain the resulting quotient of one and remainder of five. This quotient is then converted to the address for memory location one and stored in first field 602, and the remainder is stored as the bit offset in second field 604 of locator 600(3).

Locator 600(4) indicates that the compressed data segment associated with the fourth block 202(4) of image 200 begins in memory location one (first field 602) after the $48^{th}$ bit (second field 604). (The first 48 bits are occupied by the compressed data segment associated with the third block 202(3).) AOD 504 generated locator 600(4) by dividing the sum of the bit lengths of the previously-compressed data segments (in this case the sum of 37 bits+32 bits+43 bits, which is stored in accumulated size register 506) by 64, to obtain the resulting quotient of one and remainder of 48. This quotient is then converted to the address for memory location one and stored in first field 602, and the remainder is stored as the bit offset in second field 604 of locator 600(4).

Locator 600(5) indicates that the compressed data segment associated with the fifth block 202(5) of image 200 begins in memory location three (first field 602) after the third bit (second field 604). (The first three bits are occupied by the compressed data segment associated with the fourth block 202(4).) AOD 504 generated locator 600(5) by dividing the sum of the bit lengths of the previously-compressed data segments for image 200 (in this case the sum of 37 bits+32 bits+43 bits+83 bits) by 64, to obtain the resulting quotient of three and remainder of three. This quotient is then converted to the address for memory location three and stored in first field 602, and the remainder is stored as the bit offset in second field 604.

Locator 600(14400) indicates that the compressed data segment associated with the last block 202(14400) of image 200 begins in memory location 7192 (first field 602) after the $17^{th}$ bit (second field 604). Additionally, end locator 700 indicates that the compressed data segment associated with block 202(14400) ends in memory location 7193 (first field 602) with the $28^{th}$ bit in that memory location. AOD 504 generated end locator 700 by dividing the sum of the bit lengths of all the compressed data segments for image 200 (which stored in accumulated size register 506 after locator 600(14400) is generated) by 64, to obtain the resulting quotient of 7193 and remainder of 28. This quotient is then converted to the address for memory location 7193 and stored in first field 702, and the remainder is stored in second field 704, indicating the last bit of the compressed data segment associated with block 202(14400).

Figure 8:
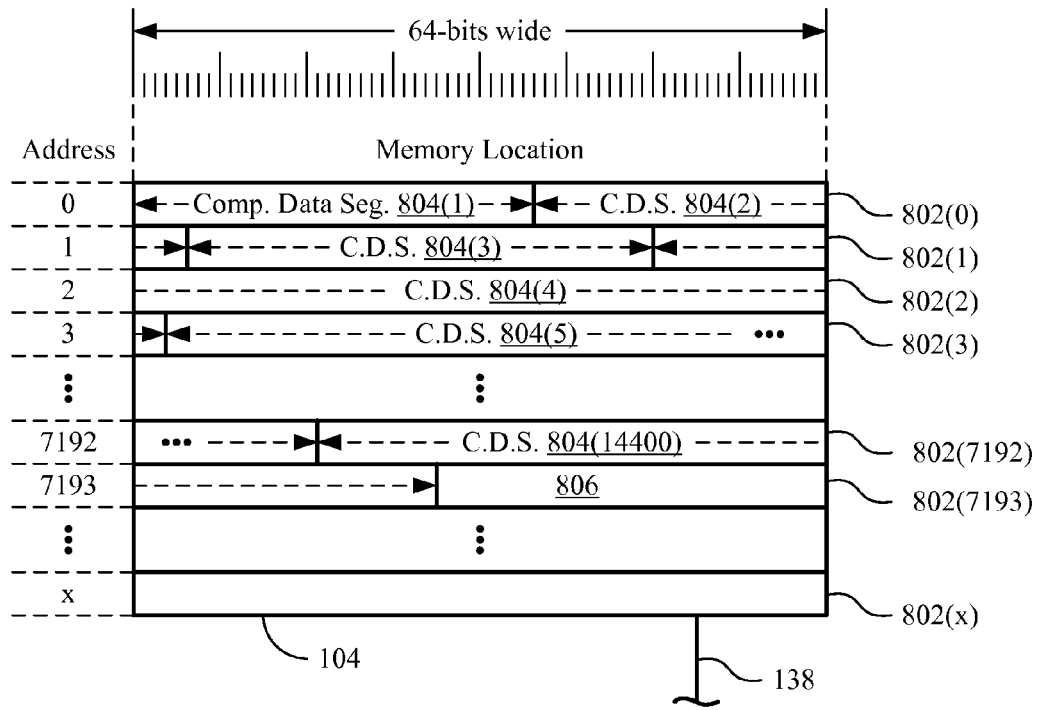
FIG. 8 shows the compressed data memory of FIG. 1 storing a series of compressed data segments associated with the locators of FIG. 7 according to one embodiment of the present invention.

FIG. 8 shows compressed data memory 104 (FIG. 1) storing the series of hypothetical compressed data segments associated with locators 600(1)-600(5) and 600(14400) of FIG. 7. Compressed data memory 104 includes a plurality of addressable memory locations 802(0)-802(x). The number of memory locations 802(0)-802(x) shown in compressed data memory 104 is exemplary in nature, and can vary by application and compression ratio, and should not be construed as limiting the invention. As shown in FIG. 8, each memory location 802(0)-802(x) is 64 bits wide.

Compressed data memory 104 stores the series of compressed data segments 804(1)-804(n) associated with blocks 202(1)-202(n) of image 200 contiguously in the memory locations 802(0)-802(x). In the hypothetical example shown, the series of compressed data segments 804(1)-804(14400) associated with the blocks 202(1)-202(14400) of the 1280× 720 pixel image 200 occupy memory locations 802(0)-802 (7193). The memory locations 802(1)-802(x) of compressed data memory 104 may be cleared as needed (e.g., between consecutive images, etc.), for example by a reset signal received via timing and control path 138.

The locators 600(1)-600(14400) indicate the locations of the associated compressed data segments 804(1)-804(14400)

within the memory locations 802(0)-802(7193). For example, compressed data segment 804(1) begins with the first bit in memory location 802(0), as indicated by locator 600(1). Compressed data segment ("C.D.S.") 804(2) begins after the 37$^{th}$ bit (i.e., begins with the 38$^{th}$ bit) in memory location 802(0), as indicated by locator 600(2). Compressed data segment 804(3) begins after the fifth bit in memory location 802(1), as indicated by locator 600(3). Compressed data segment 804(4) begins after the 48$^{th}$ bit in memory location 802(1), as indicated by locator 600(4). Compressed data segment 804(5) begins after the third bit in memory location 802(3), as indicated by locator 600(5). This continues to the last compressed data segment 804(14400) for the image 200, which begins after the 17$^{th}$ bit in memory location 802(7192). End locator 700 finally indicates that the end of compressed data segment 804(14400) ends with the 28$^{th}$ bit in memory location 802(7193).

Figure 9:
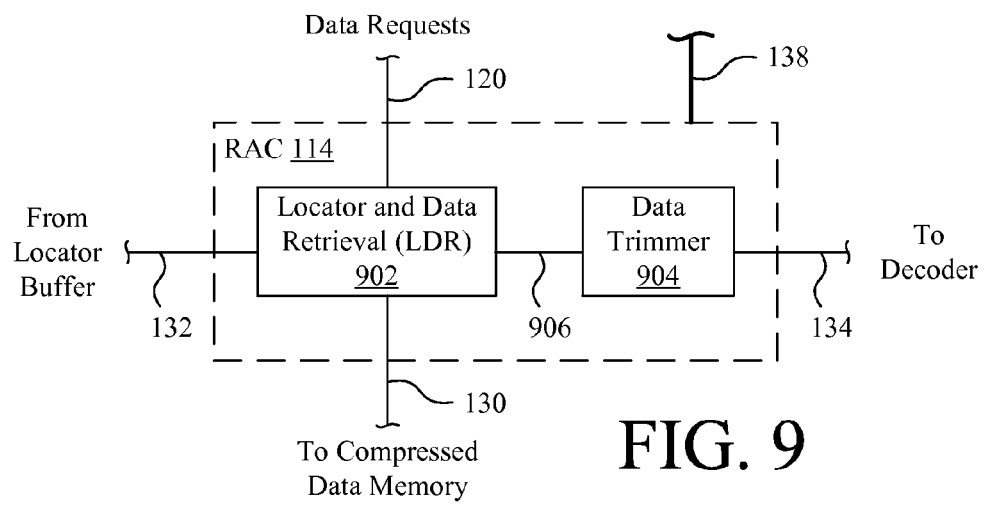
FIG. 9 is a block diagram showing the Random Access Controller of FIG. 1 in greater detail, according to one embodiment of the present invention.

FIG. 9 is a block diagram showing RAC 114 (FIG. 1) in greater detail, according to one embodiment of the invention. As shown, RAC 114 receives requests for any of blocks 202(1)-202(n) of image 200 from host device 100 via data request input 120. The requests from host device 100 provide an indication (e.g., a block identifier, etc.) as to which block(s) 202(1)-202(n) of image 200 that host device 100 wants access to and, accordingly, which compressed data segment(s) stored in compressed data memory 104 need to be decoded. For each requested block, RAC 114 retrieves the associated compressed data segment from compressed data memory 104, and provides the retrieved compressed data segment to decoder 110 for decoding into a decoded block of image data. RAC 114 provides an important advantage in that it can retrieve and output the compressed data segments from compressed data memory 104 in any order requested by host device 100. In other words, the invention facilitates randomly accessing and decoding the compressed data segments associated the blocks 202(1)-202(n) of image 200, in any order.

In FIG. 9, RAC 114 is shown to include a locator and data retrieval (LDR) unit 902 and a data trimmer 904, which communicate via a data path 906. When a request for a block 202 arrives via data request input 120, LDR unit 902 retrieves the locator 600 associated with the requested block 202, as well as the locator 600 for the block 202 that was encoded next after the requested block 202. In the case that the last block 202(n) is requested, LDR unit 902 retrieves the locator 600(n) and the end locator 700. In the case that a plurality of consecutive blocks 202 are requested, LDR unit 902 retrieves the locator 600 associated with the first block 202 in the requested plurality and the locator for the block 202 that was encoded next after the last block 202 in the requested plurality or the end locator 700. Thus, in the present embodiment, LDR unit 902 retrieves at least two locators 600, or one locator 600 and the end locator 700, for any of the above request types received on data request input 120.

Because the blocks 202(1)-202(n) of image 200 are encoded in a predetermined sequence and because the locators 600(1)-600(n) and 700 are generated and stored in locator buffer 112 in the same predetermined sequence for each image 200, LDR unit 902 can retrieve the appropriate locators 600(1)-600(n) and 700 from locator buffer 112 if it knows this predetermined sequence and the memory locations in locator buffer 112 at which the locators 600(1)-600(n) and 700 will be stored. Optionally, the data requests can include identifiers that match the identifiers contained in third field 606 of the locators 600(1)-600(n) and end locator 700), which LDR unit 902 can use to retrieve the requested locators 600 and end locator 700 from locator buffer 112.

Using the locators 600 retrieved for a request from host device 100, LDR unit 902 then retrieves the compressed data segments 804 from compressed data memory 104 between and including the two memory locations 802 identified in the first fields 602 of the retrieved locators 600 or between the two memory locations 802 identified in the first field 602 of the locator 600 and the first field 702 of the end locator 700. LDR unit 902 then provides the retrieved compressed data and at least the bit offsets contained in second fields 604, or the bit offset in the second field 604 and the value in the second field 704 of the end locator 700, to data trimmer 904 via data path 906.

Data trimmer 904 utilizes the values in the second fields 604 and 704 of the retrieved locators 600 and 700 to trim both ends of the compressed data retrieved from compressed data memory 104. The bit offset in the second field 604 of the first locator 600 indicates that the first bit of the requested compressed data begins after a number of bits equal to the bit offset. Therefore, data trimmer 904 removes ("trims") a number of bits in the retrieved compressed data equal to this offset. Similarly, the second field 604 of the second locator 600 (or the second field 704 of the end locator 700) indicates where the compressed data for the last requested block 202 ends. Accordingly, data trimmer 904 removes the portion of the retrieved compressed data after the bit identified in the second field 604 (or second field 704) of the second locator 600 (or end locator 700). Once trimmed, data trimmer 904 provides the requested compressed data segment(s) 804 associated with the requested block(s) to decoder 110 via data path 134.

The following examples with reference to FIGS. 7 and 8 further explain the compressed data retrieval and trimming aspects of the invention. The invention facilitates retrieval and decoding of the compressed data segments of an image 200 independently and in any order.

In a first example, RAC 114 receives a request for the second block 202(2) of image 200. Upon receiving the request, LDR unit 902 retrieves locators 600(2) and 600(3) from locator buffer 112 via data path 132. Based on the memory addresses in first field 602 of locators 600(2) and 600(3), LDR unit 902 retrieves the 64 bits of compressed data stored in memory location 802(0) and the 64 bits of compressed data stored in memory location 802(1). LDR unit 902 then provides at least the second field 604 of each of locators 600(2) and 600(3), and the compressed data from memory locations 802(0) and 802(1) to data trimmer 904. Data trimmer 904 utilizes the bit offset in the second field 604 of locator 600(2) to remove the portion of the compressed data from memory location 802(0) that is not part of the compressed data for the second block 202(2). Specifically, the first 37 bits of compressed data stored in memory location 802(0) are associated with the compressed data segment for the first block 202(1) of image 200 and not the second block 202(2). Therefore, data trimmer 904 removes these bits from the beginning of the compressed data retrieved from memory location 802(0). Data trimmer 904 then utilizes the bit offset in the second field 604 of locator 600(3) to also remove the portion of the compressed data retrieved from memory location 802(1) that is not part of the compressed data for the second block 202(2). Specifically, the sixth through the last bits of compressed data retrieved from memory location 802(1) are associated with the third block 202(3) and not the second block 202(2). Therefore, data trimmer 904 removes these bits from the compressed data retrieved from memory location 802(1). The resulting compressed data retrieved from memory locations 802(0) and 802(1) corresponds to the compressed data segment 804(2) associated with block 202

(2). Data trimmer 904 then provides compressed data segment 804(2) to decoder 110 for decoding via data path 134.

In a second example, RAC 114 receives a request for blocks 202(2) through 202(4) of image 200. Accordingly, LDR unit 902 retrieves locators 600(2) and 600(5) from locator buffer 112 via data path 132. Based on the memory addresses identified in the first fields 602 of locators 600(2) and 600(5), LDR unit 902 also retrieves the 64 bits of compressed data stored in memory location 802(0) and memory location 802(3), as well as the compressed data stored in intermediate memory locations 802(1) and 802(2), of compressed data memory 104. In other words, the LDR unit 902 retrieves the compressed data from memory locations 802(0) through 802(3), inclusive. LDR unit 902 then provides at least the second field 604 of each of locators 600(2) and 600(5), and the compressed data from memory locations 802(0)-802(3) to data trimmer 904. Data trimmer 904 utilizes the bit offset in the second field 604 of locator 600(2) to remove the first 37 bits of compressed data stored in memory location 802(0). Data trimmer 904 then utilizes the bit offset in the second field 604 of locator 600(5) to also remove the fourth through the last bits of compressed data retrieved from memory location 802(3), because those bits are associated with the fifth block 202(5) and not the fourth block 202(4). The resulting compressed data from memory locations 802(0)-802(3) corresponds to the compressed data segments 804(2)-804(4) associated with blocks 202(2) through 202(4). Data trimmer 904 then provides this series of compressed data segments 804(2)-804(4) to decoder 110 for decoding via data path 134.

In a third example, RAC 114 receives a request for the last block 202(14400) of image 200. Upon receiving the request, LDR unit 902 retrieves locator 600(14400) and end locator 700 from locator buffer 112 via data path 132. Based on the memory addresses identified in first field 602 of locator 600(14400) and the first field 702 of end locator 700, LDR unit 902 retrieves the 64 bits of compressed data stored in memory location 802(7192) and the 64 bits of compressed data stored in memory location 802(7193). LDR unit 902 then provides at least the second field 604 of locator 600(14400) and the second field 704 of end locator 700, and the compressed data from memory locations 802(7192) and 802(7193), to data trimmer 904. Data trimmer 904 utilizes the bit offset in the second field 604 of locator 600(14400) to remove the first 17 bits of compressed data stored in memory location 802(7192), which are associated with the block 202(14399) and not block 202(14400). Data trimmer 904 then utilizes the value in the second field 704 of end locator 700 to also remove the portion of the compressed data retrieved from memory location 802(7193) that is not part of the compressed data for the last block 202(14400). Specifically, the $29^{th}$ through last bits of compressed data stored in memory location 802(7193) are removed. The resulting compressed data from memory locations 802(7192)-802(7193) corresponds to compressed data segment 804(14400) associated with the last block 202(14400). RAC 114 then provides compressed data segment 804(14400) to decoder 110 via data path 134.

Figure 10:
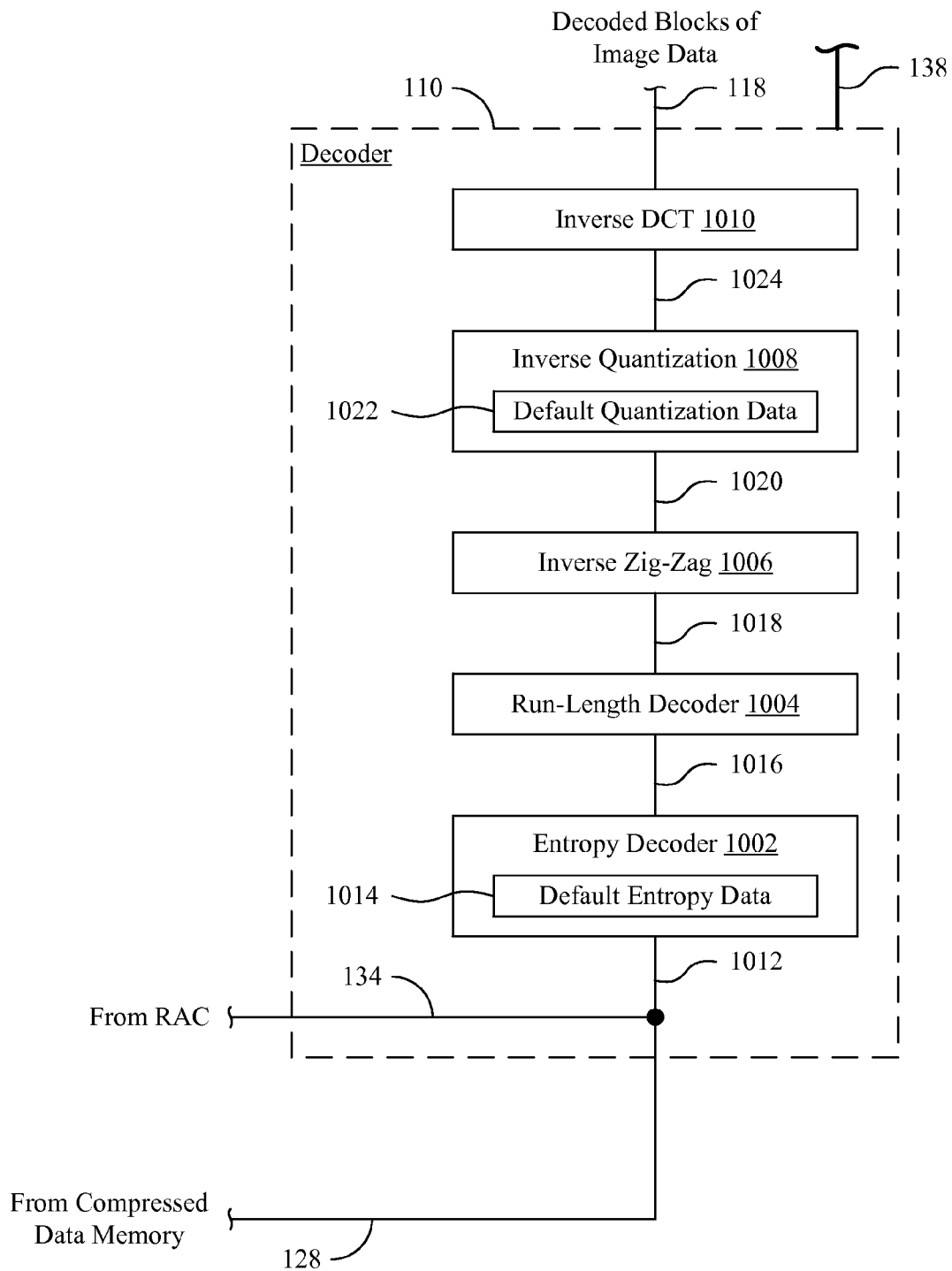
FIG. 10 is a block diagram showing the decoder of FIG. 1 in greater detail, according to one embodiment of the present invention.

FIG. 10 is a block diagram showing decoder 110 in greater detail, according to one embodiment of the present invention. As shown in FIG. 10, decoder 110 includes an entropy decoder 1002, a run-length decoder 1004, an inverse zig-zag unit 1006, an inverse quantization unit 1008, and an inverse DCT unit 1010.

Compressed data segments 804(1)-804(n) associated with blocks 202(1)-202(n) of image 200 are provided to decoder 110 from RAC 114 via data path 134 and directly from compressed data memory 104 via data path 128 to be decoded into blocks of decoded image data. Data paths 128 and 134 converge into data path 1012, whereby compressed data segments are provided to entropy decoder 1002 as an entropy-encoded data (EED) stream. In the present embodiment, entropy decoder 1002 decodes only one EED stream at a time. If the compressed data for an entire image 200 is to be decoded, it is efficient to provide the compressed data segments 804(1)-804(n) directly from compressed data memory 104. Alternatively, one or more randomly-accessed compressed data segment(s) 804(1)-804(n) are provided to decoder 110 by RAC 114, as described previously. Decoder 110 decodes each compressed data segment 804(1)-804(n) according the following process.

Entropy decoder 1002 receives a compressed data segment 804 associated a block 202 via data path 1012 and performs an inverse entropy process on the compressed data segment 804 to produce RLE data associated with the block 202. Entropy decoder 1002 employs default entropy data 1014 during entropy decoding. The default entropy data 1014 is the same as default entropy data 324 used by ELU 310 during the encoding process. Because the entropy decoder 1002 can access default entropy data 1014, entropy decoder 1002 does not parse a data header in the compressed data stream to obtain the entropy data used during the decoding process.

Once entropy decoder 1002 has decoded the compressed data segment 804 into RLE data associated with the block 202, entropy decoder 1002 provides the RLE data to run-length decoder 1004. Run-length decoder 1004 decodes the RLE data into a plurality of quantized coefficients associated with the block 202, and provides the plurality of quantized coefficients to inverse zig-zag unit 1006 via data path 1018.

Inverse zig-zag unit 1006 receives the plurality of quantized coefficients and performs an inverse zig-zag process on the plurality of quantized coefficients to generate an 8-by-8 block of quantized coefficients. Inverse zig-zag unit 1006 then provides the block of quantized coefficients to inverse quantization unit 1008 via data path 1020.

Inverse quantization unit 1008 receives the block of quantized coefficients and dequantizes the block into an 8-by-8 block 402 of absolute DCT coefficients using the default quantization data 1022. The default quantization data 1022 is the same as the default quantization data 316 used by encoder 106 during the encoding process. Because inverse quantization unit 1008 can access default quantization data 1022, inverse quantization unit 1008 advantageously does not have to parse a data header in the compressed data stream to obtain the quantization data used during the dequantization process. Following dequantization, inverse quantization unit 1008 provides the block of absolute DCT coefficients associated with the block 202 to inverse DCT unit 1010 via data path 1024.

Inverse DCT unit 1010 receives the block of absolute DCT coefficients and performs an inverse DCT on the block of absolute DCT coefficients to produce an 8-by-8 block of decoded pixel data. Because the DCT coefficients provided by inverse quantization unit 1022 are all absolute values, the inverse DCT process is very simple compared to the prior art. For example, the relative inverse DCT process used in the prior art involves adding a relative DC coefficient of the current block to a DC coefficient value obtained from a previous block of DCT coefficients. In contrast, the inverse DCT unit 1010 of the present invention receives an absolute DC coefficient value from the inverse quantization unit 1008 and, therefore, does not have to undertake an addition process like the prior art.

Once the inverse DCT process is completed, inverse DCT unit 1010 outputs an 8-by-8 block of decoded image data decompressed from the associated compressed data segment 804. The decoded block of image data can then be used as desired by host device 100.

Like encoder 106, decoder 110 is not constrained by the JPEG encoding standard and associated file formats. Advantageously, decoder 110 has access to default entropy data 1014 and default quantization data 1022 such that decoder 110 does not have to parse a header to obtain configuration information prior to decoding compressed data segments. This feature in turn provides the advantage that compressed data for an image (e.g., a frame of video) can be stored in compressed data memory 104 without the header, thereby improving data compression. Improving the compression in this way also compensates for encoding the absolute DC coefficients during the DCT process in encoder 106.

Particular embodiments of the invention have now been described in detail. However, it should be understood that various modifications to the invention are possible and within the scope of the invention, especially in view of the concepts and principles described above.

As one example, the functions of RAC 114 can be moved within decoder 110. For example, the locator and compressed data segment retrieval and/or compressed data trimming functions of RAC 114 can be incorporated into decoder 110 in or prior to entropy decoder 1002. Similarly, it may also be beneficial to incorporate locator buffer 112 into a component of decoder 110 or some other component shown in FIG. 1.

The invention can also be modified to use headers to pass configuration information (e.g., entropy tables and quantization tables, etc.) between the encoder and decoder for each frame. Additionally, a header can be used to maintain compatibility with a particular compression standard (e.g., JPEG). However, storing the header in the compressed data memory reduces the amount of data compression, and the decoder 110 would have to be modified to parse the header. The locators 600 might also have to be adjusted when they are generated to compensate for the space occupied by the header in the compressed data memory 104.

It should also be noted that the locators described herein can also be modified according to the application. As one example, each compressed data segment 804(1)-804(n) could be allocated one or more predetermined memory location(s) 802 in the compressed data memory 104, and each locator 600(1)-600(n) could be a memory pointer pointing to that predetermined location. As another example, each locator might only indicate a size of the associated compressed data segment. RAC 114 could then be modified to use these segment sizes to locate particular compressed data segments 804(1)-804(n) in compressed data memory 104 in real time, for example, by summing the sizes defined in all prior locators 600 in the frame and dividing by the width of memory 104 to obtain a quotient and remainder, which could be used as described above. These and other modifications are possible.

As still another example, compressed data memory 104 and locator buffer 112 can be modified to store compressed data segments 804(1)-804(n) and locators 600(1)-600(n) for multiple images/frames 200.

Figure 11:
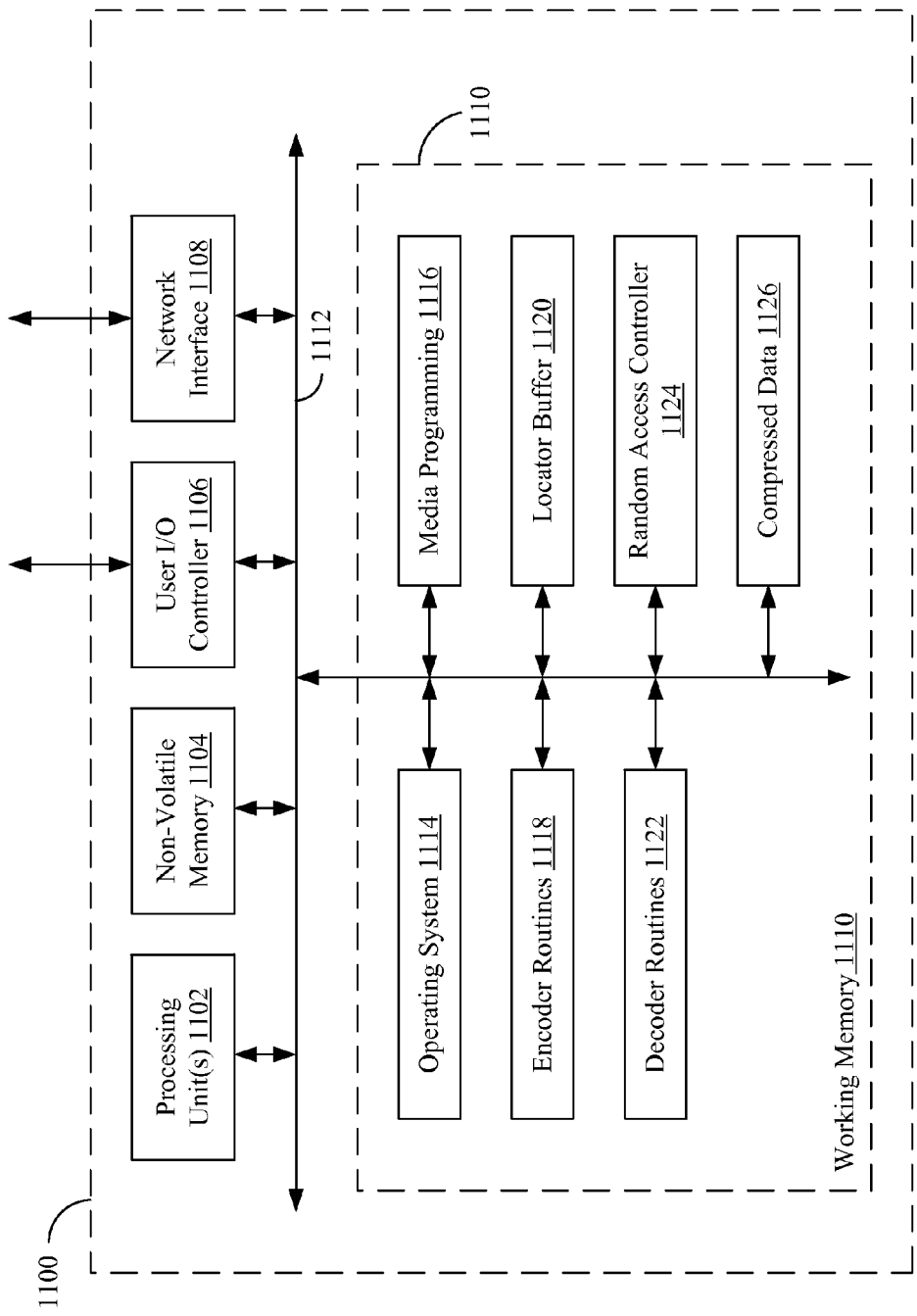
FIG. 11 is a block diagram of a computer system showing the codec system of the present invention implemented in software, according to one embodiment of the present invention.

FIG. 11 is a block diagram of a computer system 1100 showing the encoder and/or the decoder of the present invention implemented by software, e.g., by code embodied in an electronically-readable storage medium. Computer system 1100 includes one or more processing unit(s) (CPU) 1102, non-volatile memory 1104, a user I/O controller 1106, a network interface 1108, and a working memory 1110, all intercommunicating via a system bus 1112. CPU(s) 1102 execute(s) data and code contained in working memory 1110 to cause computer system 1100 to carry out its intended functions (e.g. image processing, video playback, etc.). Non-volatile memory 1104 (e.g. read-only memory, one or more hard disk drives, flash memory, etc.) provides storage for data and code (e.g., boot code, encoder and decoder programs, random access controller programs, compressed image files, etc.) that are retained even when computer system 1100 is powered down. User I/O controller 1106 manages connections for user interface devices (not shown), for example a keyboard, mouse, monitor, printer, camera, and other such devices that facilitate interaction and communication between computer system 1100 and a user. Network interface 1108 (e.g. an Ethernet adapter card) transmits data packets onto and receives data packets from an internetwork (e.g., the Internet), such that a user can send and receive data (e.g., image data) via the internetwork. System bus 1112 facilitates intercommunication between the various components of computer system 1100.

Working memory 1110 (e.g. random access memory) provides dynamic memory to computer system 1100, and includes executable code (e.g. an operating system 1114, etc.), which is loaded into working memory 1110 during system start-up. Operating system 1114 facilitates control and execution of all other modules loaded into working memory 1110. Working memory 1110 also includes media programming 1116 (e.g., an image viewer, movie player, etc.). Encoder routines 1118 represent routines that perform any and all of the functionality of encoder 106 described previously herein. Encoder routines 1118 generate locators 600(1)-600(n) and store those locators 600(1)-600(n) in a locator buffer 1120, which is also defined in working memory 1110. Working memory 1110 also includes decoder routines 1122 that can perform any and all of the functionality of decoder 110 described herein. Working memory 1110 also includes a random access controller module 1124, which provides any and all of the functions of RAC 114 shown in FIGS. 1 and 8. Compressed data segments 804(1)-804(n) generated by encoder routines 1118 are stored in compressed data buffer 1126 defined in working memory 1110, and/or it can be stored in non-volatile memory 1104. Optionally, the locators 600(1)-600(n) stored in buffer 1120 can also be stored in non-volatile memory 1104 (e.g., as a locator file) for later retrieval.

Each of the foregoing programs and buffers can be initialized in and/or loaded into working memory 1110 from non-volatile memory 1104. Optionally, the foregoing programs and buffers can be loaded into working memory 1110 from alternate mass data storage devices including, but not limited to, a CD-ROM, DVD-ROM, flash drive, etc. Additionally, some or all of the programs described can be loaded into working memory 1110 as needed.

The methods of the present invention will now be described with reference to FIGS. 12-15. For the sake of clear explanation, these methods might be described with reference to particular elements of the previously-described embodiments that perform particular functions. However, it should be noted that other elements, whether explicitly described herein or created in view of the present disclosure, could be substituted for those cited without departing from the scope of the present invention. Therefore, it should be understood that the methods of the present invention are not limited to any particular element(s) that perform(s) any particular function(s). Further, some steps of the methods presented need not necessarily occur in the order shown. For example, in some cases two or more method steps may occur simultaneously. These and other variations of the methods disclosed herein will be readily apparent, especially in view of the description of the present invention provided previously herein, and are considered to be within the full scope of the invention.

Figure 12:
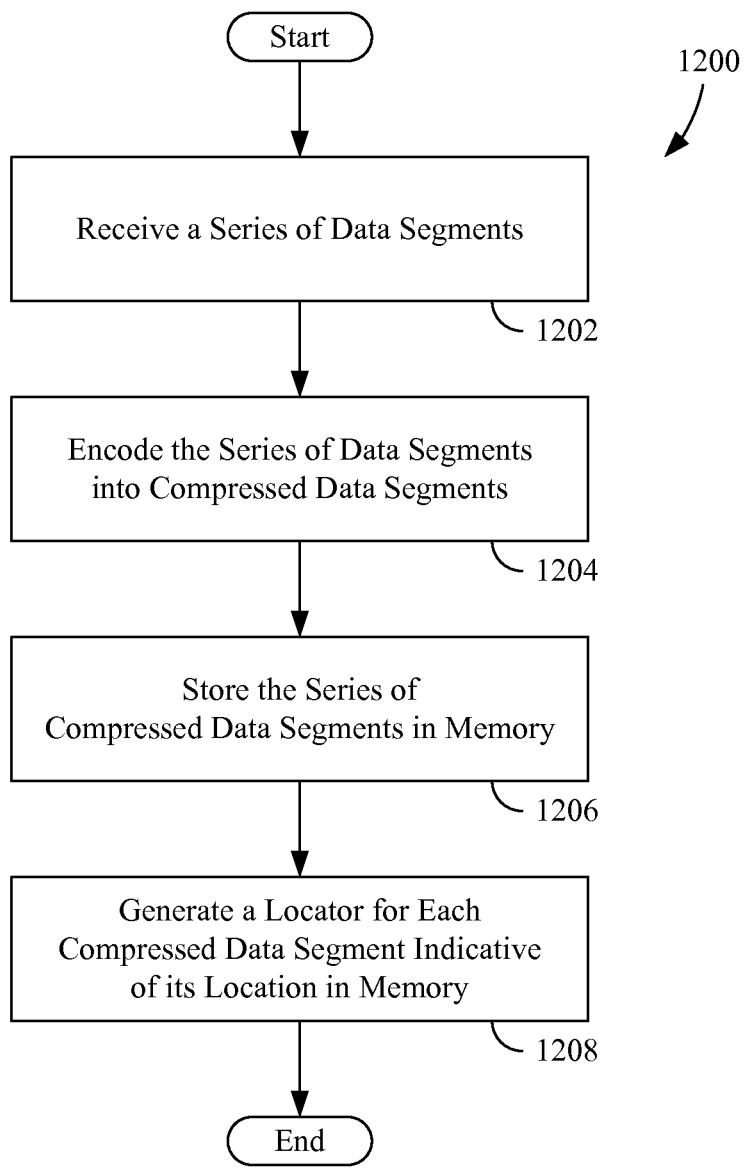
FIG. 12 is a flowchart summarizing a method of facilitating random access to segments of compressed data stored in a memory, according to the present invention.

FIG. 12 is a flowchart summarizing a method 1200 of facilitating random access to segments of compressed data stored in a compressed data memory, according to the present invention. In a first step 1202, a series of data segments (e.g., blocks 202(1)-202(n) of image 200) are received via a data input 116. In a second step 1204, encoder 106 encodes the series of data segments into a series of compressed data segments 804(1)-804(n), where each of the compressed data segments 804(1)-804(n) has a variable segment size. Then, in a third step 1206, the series of compressed data segments 804(1)-804(n) are stored in the compressed data memory 104. In a fourth step, 1208, a locator generator 108 generates a locator 600 for each of the compressed data segments 804(1)-804(n) in the series, where the locators 600(1)-600(n) are indicative of the locations of the associated compressed data segments 804(1)-804(n) in the compressed data memory 104.

Figure 13:
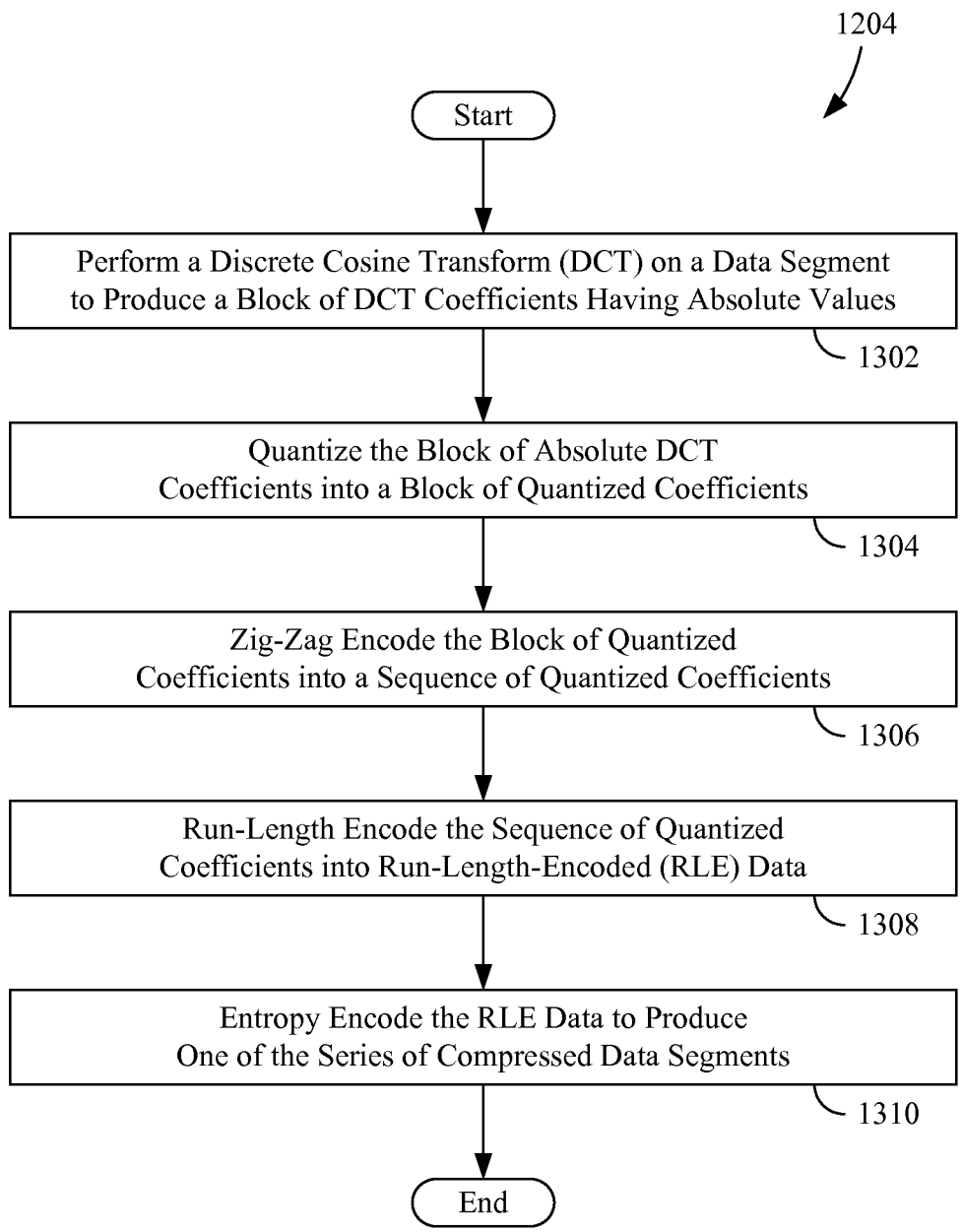
FIG. 13 is a flowchart summarizing a particular method of performing the second step (encode the series of data segments) of the method of FIG. 12, according to the present invention.

FIG. 13 is a flowchart summarizing a particular method of performing the second step 1204 (encode the series of data segments) of method 1200 according to the present invention. The method shown in FIG. 13 is performed for each data segment in the series of data segments. According to this method, the series of data segments comprise blocks 202(1)-202(n) of pixel data of an image 200.

In a first step 1302, a discrete cosine transform (DCT) is performed on one of the blocks 202(1)-202(n) of pixel data to produce a block 402 of DCT coefficients, where the DCT coefficients are absolute values (i.e., is not defined relative to DCT coefficients in another block). Then, in a second step 1304, the block 402 of absolute DCT coefficients is quantized using quantization data 316 to produce a block of quantized coefficients. Next, in a third step 1306, the block of quantized coefficients is zig-zag encoded to produce a sequence of quantized coefficients and, in a fourth step 1308, the sequence of quantized coefficients is run-length encoded to produce run-length-encoded (RLE) data. Then, in a fifth step 1310, the RLE data is entropy encoded using entropy data 324 to produce one of the series of compressed data segments 804(1)-804(n).

Figure 14:
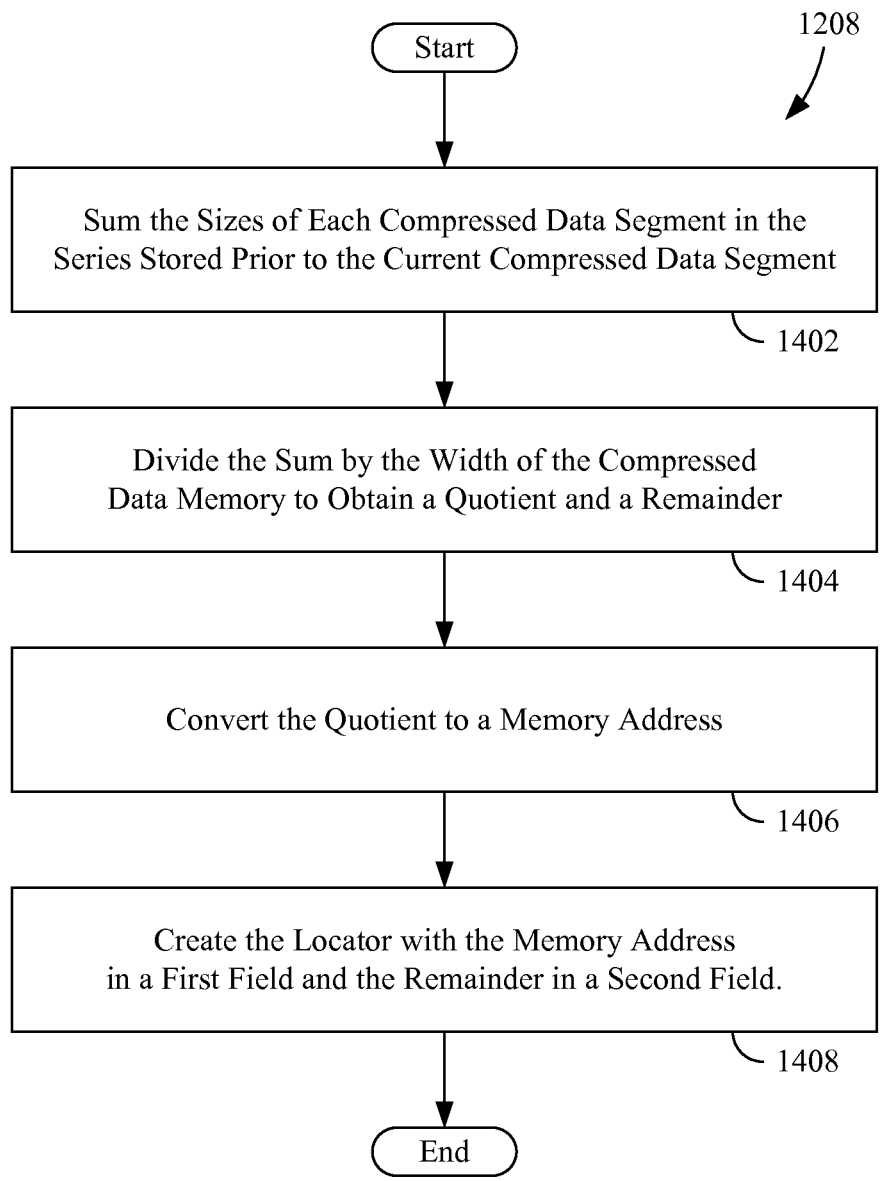
FIG. 14 is flowchart summarizing a particular method of performing the fourth step (generate locator) of the method of FIG. 12 according to the present invention.

FIG. 14 is flowchart summarizing a particular method of performing the fourth step 1208 (generate locator) of the method 1200 according to the present invention. The method shown in FIG. 14 is performed for each locator 600 of the plurality of locators 600(1)-600(n) that is generated. Recall that each locator 600(1)-600(n) is associated with one of the series of compressed data segments 804(1)-804(n).

In a first step 1402, a sum of the sizes of each of the compressed data segments 804 in the series of compressed data segments 804(1)-804(n) that were previously stored in the compressed data memory 104 is calculated. Then, in a second step 1404, this sum is divided by a value equal to the width (e.g., 64 bits) of each of the memory locations 802(0)-802(x) of compressed data memory 104 to obtain a quotient and a remainder. Then, in a third step 1406, the quotient is converted to a memory address identifying the memory location 802 of memory locations 802(0)-802(x) where the compressed data segment 804 associated with the locator 600 will be stored. Then, in a fourth step 1408, the locator 600 for the associated compressed data segment 804 is created with a first field 602 containing the memory address and a second field 602 containing the remainder.

Figure 15:
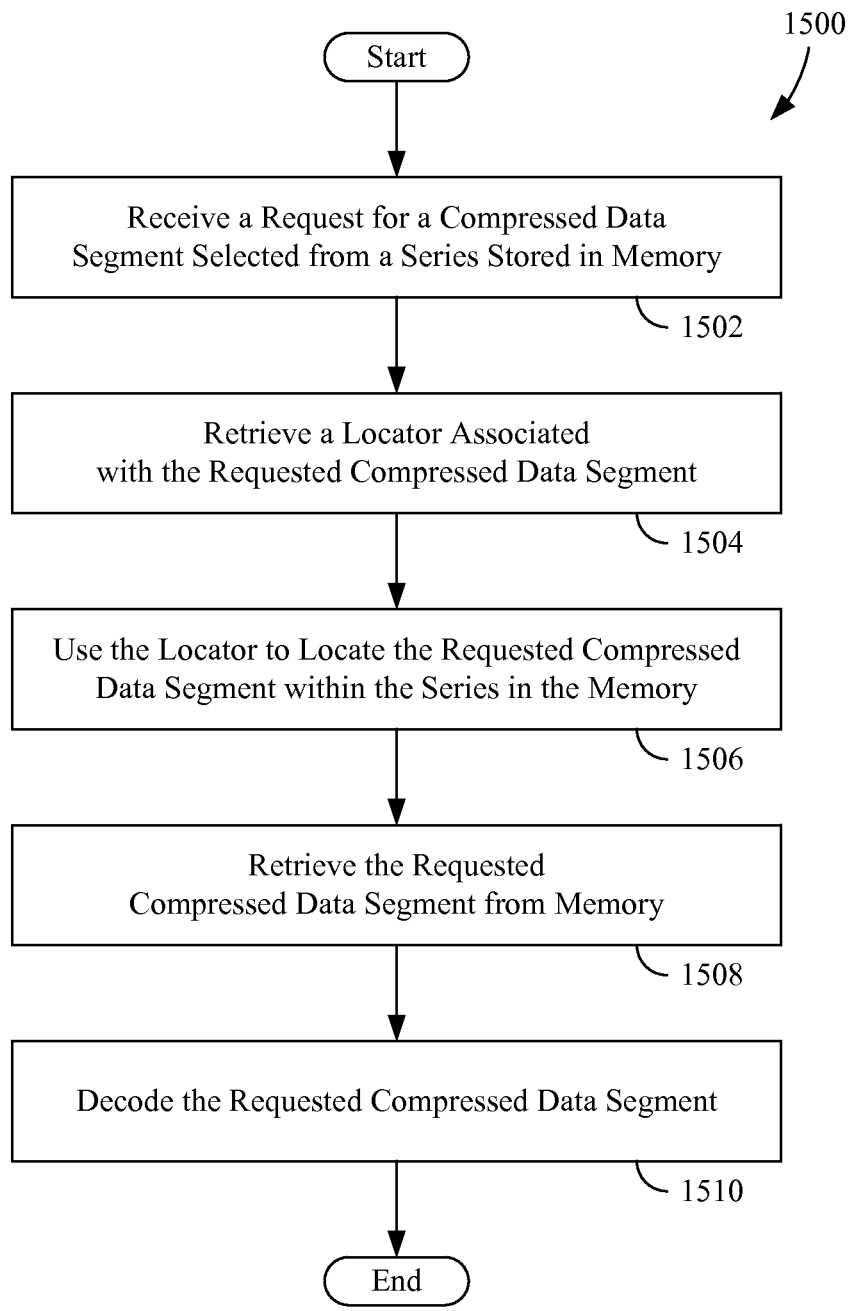
FIG. 15 is a flowchart summarizing a method of randomly accessing a segment of compressed data from memory, according to the present invention.

FIG. 15 is a flowchart summarizing a method 1500 of randomly accessing a compressed data segment 804 of the series of compressed data segments 804(1)-804(n) from a compressed data memory 104, according to the present invention. In a first step 1502, a request for at least one compressed data segment 804 corresponding to at least one data segment (e.g., at least one of blocks 202(1)-202(n) of image 200) is received via data request input 120. The requested compressed data segment 804 is one of a series of variable-size compressed data segments 804(1)-804(n) stored in compressed data memory 104. Then, in a second step 1504, at least one locator 600 associated with the requested compressed data segment 804 is retrieved from locator buffer 112. Next, in a third step 1506, the retrieved locator 600 is used to locate the requested compressed data segment 804 among the series of compressed data segments 804(1)-804(n) in the compressed data memory 104. Then, in a fourth step 1508, the requested compressed data segment 804 is retrieved from compressed data memory 104 by RAC 114 and provided to decoder 110. Following, in a fifth step 1510, the requested compressed data segment 804 is decoded by decoder 110 and a decoded data segment is provided on decoded data output 118.

The description of particular embodiments of the present invention is now complete. Many of the described features may be substituted, altered or omitted without departing from the scope of the invention. For example, alternative locators (e.g., memory pointers, segment sizes, etc.), may be substituted for the locators described herein. As another example, frame headers can be employed to facilitate changing the data used during encoding and decoding (e.g., quantization data and entropy data) each frame. These and other deviations from the particular embodiments shown will be apparent to those skilled in the art, particularly in view of the foregoing disclosure.

We claim:

1. A method facilitating random access to segments of compressed data stored in memory, said method comprising:
   receiving a series of data segments;
   encoding said series of data segments into a series of compressed data segments, each of said compressed data segments having a variable segment size;
   storing said series of compressed data segments in a compressed data memory;
   determining the size of each of said compressed data segments; and
   generating a locator for each of said compressed data segments; and wherein
   said locator identifies a memory location of said compressed data memory storing at least part of an associated compressed data segment;
   said locator includes a memory address and an offset, said memory address identifying said memory location from a plurality of memory locations of said compressed data memory, and said offset being indicative of the position of a first bit of said associated compressed data segment within said memory location; and
   said step of generating said locator of said associated compressed data segment includes
      calculating a sum of the sizes of each of said compressed data segments in said series stored prior to said associated compressed data segment,
      dividing said sum by a value equal to the width of each of said plurality of memory locations of said compressed data memory to obtain a quotient and a remainder,
      converting said quotient to said memory address, and setting said offset equal to said remainder.

2. The method of claim 1, wherein:
   said series of data segments comprises a series of blocks of image data;

said step of encoding includes performing a Discrete Cosine Transform (DCT) on each block of image data in said series to generate a series of blocks of DCT coefficients; and the DCT coefficients in each said block of DCT coefficients are generated without reference to any other block of DCT coefficients in said series.

3. The method of claim 2, wherein, for each block of DCT coefficients in said series of blocks of DCT coefficients, said step of encoding further includes:
quantizing said block of DCT coefficients to produce a block of quantized coefficients;
zig-zag encoding said block of quantized coefficients to produce a sequence of quantized coefficients;
run-length encoding said sequence of quantized coefficients to produce run-length-encoded (RLE) data; and
entropy encoding said RLE data to produce one of said series of compressed data segments.

4. The method of claim 3, further comprising:
receiving a second series of data segments;
encoding said second series of data segments into a second series of compressed data segments; and wherein:
said step of quantizing said block of DCT coefficients includes using quantization data to quantize said block of DCT coefficients;
said step of entropy encoding said RLE data includes using entropy data to entropy-encode said RLE data; and
said quantization data and said entropy data does not change between said steps of encoding said series of data segments and encoding said second series of data segments.

5. The method of claim 1, wherein said series of compressed data segments is stored in said compressed data memory free of header information associated with said series of compressed data segments.

6. The method of claim 1, further comprising storing said locator for each of said compressed data segments.

7. The method of claim 6, further comprising:
receiving a request for at least one compressed data segment selected from said series of compressed data segments stored in said compressed data memory;
retrieving the locator associated with said requested compressed data segment;
using said retrieved locator to locate the beginning of said requested compressed data segment among said series of compressed data segments stored in said compressed data memory; and
retrieving said requested compressed data segment from said compressed data memory.

8. The method of claim 7, further comprising:
retrieving a second locator associated with a second compressed data segment stored in said compressed data memory; and
using said second locator to locate the end of said requested compressed data segment in said compressed data memory.

9. The method of claim 7, further comprising decoding said requested compressed data segment out of order with the rest of said series of compressed data segments.

10. The method of claim 9, wherein said step of decoding said requested compressed data segment includes:
entropy decoding said requested compressed data segment to produce run-length-encoded (RLE) data;
run-length decoding said RLE data to produce a plurality of quantized coefficients;
performing an inverse zig-zag process on said plurality of quantized coefficients to produce a block of quantized coefficients;
dequantizing said block of quantized coefficient to produce a block of absolute Discrete Cosine Transform (DCT) coefficients; and
performing an inverse DCT process on said block of absolute DCT coefficients without reference to any other block of DCT coefficients to produce a block of decoded data.

11. The method of claim 10, wherein said step of decoding said requested compressed data segment does not include parsing a header associated with said series of compressed data segments prior to decoding said requested compressed data segment.

12. The method of claim 1, wherein:
said series of data segments comprises a series of blocks of image data defining an image; and
said compressed data memory is a frame buffer for storing compressed data defining said image.

13. A system facilitating random access to segments of compressed data stored in memory, said system comprising:
a data input coupled to receive a series of data segments;
an encoder operative to encode said series of data segments into a series of compressed data segments, each of said compressed data segments having a variable segment size;
a compressed data memory coupled to receive said series of compressed data segments from said encoder and to store said series of compressed data segments; and
a locator generator operative to determine the size of each of said series of said compressed data segments and to generate a locator for each of said series of compressed data segments; and wherein
said locator identifies a memory location of said compressed data memory storing at least part of an associated compressed data segment;
said locator includes a memory address and an offset, said memory address identifying said memory location from a plurality of memory locations of said compressed data memory, and said offset being indicative of the position of a first bit of said associated compressed data segment within said memory location; and
for each of said associated compressed data segments, said locator generator is further operative to
calculate a sum of the sizes of each of said compressed data segments in said series stored prior to said associated compressed data segment,
divide said sum by a value equal to the width of each of said plurality of memory locations of said compressed data memory to obtain a quotient and a remainder,
convert said quotient to said memory address, and
set said offset equal to said remainder.

14. The system of claim 13, wherein:
said series of data segments comprises a series of blocks of image data;
said encoder is operative to perform a Discrete Cosine Transform (DCT) on each block of image data in said series to generate a series of blocks of DCT coefficients; and
the DCT coefficients in each said block of DCT coefficients are generated without reference to any other block of DCT coefficients in said series.

15. The system of claim 14, wherein, for each block of DCT coefficients in said series of blocks of DCT coefficients, said encoder is further operative to:

quantize said block of DCT coefficients to produce a block of quantized coefficients;

zig-zag encode said block of quantized coefficients into a sequence of quantized coefficients;

run-length encode said sequence of quantized coefficients to produce run-length-encoded (RLE) data; and entropy encode said RLE data to generate one of said series of compressed data segments.

16. The system of claim 15, wherein:

said input terminal set is further operative to receive a second series of data segments;

said encoder is further operative to encode said second series of data segments into a second series of compressed data segments, quantize said block of DCT coefficients using quantization data, entropy encode said RLE data using entropy data; and said encoder is operative to encode said series of data segments and said second series of data segments using the same said quantization data and said entropy data.

17. The system of claim 13, wherein said series of compressed data segments is stored in said compressed data memory free of header information associated with said series of compressed data segments.

18. The system of claim 13, further comprising a locator memory operative to store said locator for each of said compressed data segments.

19. The system of claim 18, further comprising:

a data request input operative to receive a request for at least one compressed data segment stored among said series of compressed data segments in said compressed data memory; and a controller operative to retrieve the locator associated with said requested compressed data segment, use said retrieved locator to locate the beginning of said requested compressed data segment among said series of compressed data segments in said compressed data memory, and retrieve said requested compressed data segment from said compressed data memory.

20. The system of claim 19, wherein said controller is further operative to:

retrieve a second locator associated with a second compressed data segment stored in said compressed data memory; and use said second locator to locate the end of said requested compressed data segment in said compressed data memory.

21. The system of claim 19, further comprising a decoder operative to decode said requested compressed data segment out of order with the rest of said series of compressed data segments.

22. The system of claim 21, wherein said decoder includes:

an entropy decoder operative to entropy decode said requested compressed data segment to produce run-length-encoded (RLE) data;

a run-length decoder operative to run-length decode said RLE data to produce a plurality of quantized coefficients;

an inverse zig-zag unit operative to perform an inverse zig-zag process on said plurality of quantized coefficients to produce a block of quantized coefficients;

a dequantizer operative to dequantize said block of quantized coefficient to produce a block of absolute Discrete Cosine Transform (DCT) coefficients; and an inverse DCT unit operative to perform an inverse DCT process on said block of absolute DCT coefficients without reference to any other block of DCT coefficients.

23. The system of claim 22, wherein said decoder is operative to decode said requested compressed data segment without parsing a header associated with the series of compressed data segments prior to decoding said requested compressed data segment.

24. The system of claim 13, wherein:

said series of data segments comprises a series of blocks of image data defining an image; and said compressed data memory is a frame buffer for storing compressed data defining said image.

25. A non-transitory, electronically-readable storage medium having code embodied therein for causing an electronic device to:

receive a series of data segments;

encode said series of data segments into a series of compressed data segments, each of said compressed data segments having a variable segment size;

store said series of compressed data segments in a compressed data memory;

determine the size of each of said compressed data segments; and generate a locator for each of said compressed data segments; and wherein said locator identifies a memory location of said compressed data memory storing at least part of an associated compressed data segment;

said locator includes a memory address and an offset, said memory address identifying said memory location from a plurality of memory locations of said compressed data memory, and said offset being indicative of the position of a first bit of said associated compressed data segment within said memory location; and said locator for each of said compressed data segments is generated by causing said electronic device to calculate a sum of the sizes of each of said compressed data segments in said series stored prior to said associated compressed data segment, divide said sum by a value equal to the width of each of said plurality of memory locations of said compressed data memory to obtain a quotient and a remainder, convert said quotient to said memory address, and set said offset equal to said remainder.

26. The non-transitory, electronically-readable storage medium of claim 25, wherein:

said series of data segments comprises a series of blocks of image data;

said step of encoding includes performing a Discrete Cosine Transform (DCT) on each block of image data in said series to generate a series of blocks of DCT coefficients; and the DCT coefficients in each said block of DCT coefficients are generated without reference to any other block of DCT coefficients in said series.

27. The non-transitory, electronically-readable storage medium of claim 26, wherein, for each block of DCT coefficients in said series of blocks of DCT coefficients, said code is further operative to cause said electronic device to:

quantize said block of DCT coefficients to produce a block of quantized coefficients;

zig-zag encode said block of quantized coefficients to produce a sequence of quantized coefficients;

run-length encode said sequence of quantized coefficients to produce run-length-encoded (RLE) data; and entropy encode said RLE data to produce one of said series of compressed data segments.

28. The non-transitory, electronically-readable storage medium of claim 27, wherein said code is further operative to cause said electronic device to:
receive a second series of data segments;
encode said second series of data segments into a second series of compressed data segments; and wherein:
use quantization data to quantize said block of DCT coefficients;
use entropy data to entropy-encode said RLE data; and wherein
said quantization data and said entropy data do not change between encoding said series of data segments and encoding said second series of data segments.

29. The non-transitory, electronically-readable storage medium of claim 25, wherein said series of compressed data segments is stored in said compressed data memory free of header information associated with said series of compressed data segments.

30. The non-transitory, electronically-readable storage medium of claim 25, wherein said code is further operative to cause said electronic device to store said locator for each of said compressed data segments.

31. The non-transitory, electronically-readable storage medium of claim 30, wherein said code is further operative to cause said electronic device to:
receive a request for at least one compressed data segment selected from said series of compressed data segments stored in said compressed data memory;
retrieve the locator associated with said requested compressed data segment;
use said retrieved locator to locate the beginning of said requested compressed data segment among said series of compressed data segments stored in said compressed data memory; and
retrieve said requested compressed data segment from said compressed data memory.

32. The non-transitory, electronically-readable storage medium of claim 31, wherein said code is further operative to cause said electronic device to:
retrieve a second locator associated with a second compressed data segment stored in said compressed data memory; and
use said second locator to locate the end of said requested compressed data segment in said compressed data memory.

33. The non-transitory, electronically-readable storage medium of claim 31, wherein said code is further operative to cause said electronic device to decode said requested compressed data segment out of order with the rest of said series of compressed data segments.

34. The non-transitory, electronically-readable storage medium of claim 33, wherein said code is further operative to cause said electronic device to:
entropy decode said requested compressed data segment to produce run-length-encoded (RLE) data;
run-length decode said RLE data to produce a plurality of quantized coefficients;
perform an inverse zig-zag process on said plurality of quantized coefficients to produce a block of quantized coefficients;
dequantize said block of quantized coefficient to produce a block of absolute Discrete Cosine Transform (DCT) coefficients; and perform an inverse DCT process on said block of absolute DCT coefficients without reference to any other block of DCT coefficients to produce a block of decoded data.

35. The non-transitory, electronically-readable storage medium of claim 34, wherein said electronic device does not parse a header associated with said series of compressed data segments prior to decoding said requested compressed data segment.

36. The non-transitory, electronically-readable storage medium of claim 25, wherein:
said series of data segments comprises a series of blocks of image data defining an image; and
said compressed data memory is a frame buffer for storing compressed data defining said image.

37. A system facilitating random access to segments of compressed data stored in memory, said system comprising:
an input terminal set coupled to receive a series of data segments;
means for encoding said series of data segments into a series of compressed data segments, each of said data segments being encoded independently of any other of said compressed data segments, each of said compressed data segments having a variable segment size;
a compressed data memory coupled to receive and store said series of compressed data segments; and
means for locating each of said compressed data segments in said compressed data memory, said means for locating being operative to determine the size of each of said series of said compressed data segments and to generate a locator for each of said series of compressed data segments; and wherein
said locator identifies a memory location of said compressed data memory storing at least part of an associated compressed data segment;
said locator includes a memory address and an offset, said memory address identifying said memory location from a plurality of memory locations of said compressed data memory, and said offset being indicative of the position of a first bit of said associated compressed data segment within said memory location; and
for each of said associated compressed data segments, said means for locating each of said compressed data segments is further operative to
calculate a sum of the sizes of each of said compressed data segments in said series stored prior to said associated compressed data segment,
divide said sum by a value equal to the width of each of said plurality of memory locations of said compressed data memory to obtain a quotient and a remainder,
convert said quotient to said memory address, and
set said offset equal to said remainder.

38. A method for randomly accessing a segment of compressed data from memory, said method comprising:
receiving a request for a compressed data segment selected from a series of compressed data segments stored in a compressed data memory, each of said compressed data segments having a variable segment size;
retrieving a locator defining a size;
using said retrieved locator to locate said requested compressed data segment within said series of compressed data segments in said compressed data memory; and
retrieving said requested compressed data segment from said compressed data memory; and wherein said step of using said retrieved locator to locate said requested compressed data segment includes
  determining a sum of the sizes of each of said compressed data segments in said series stored prior to said requested compressed data segment,
  dividing said sum by a value equal to a width of each of a plurality of memory locations of said compressed data memory to obtain a quotient and a remainder,
  converting said quotient to a memory address, and
  setting an offset equal to said remainder;
said memory address identifies a memory location of said compressed data memory storing at least part of said requested compressed data segment; and
said offset indicates the position of a first bit of said requested compressed data segment within said memory location.

39. A system for randomly accessing a segment of compressed data from memory, said system comprising:
  a data request input operative to receive a request for at least one compressed data segment selected from a series of compressed data segments stored in a compressed data memory, each of said compressed data segments having a variable segment size; and
  a controller operative to
    retrieve a locator including a size,
    use said retrieved locator to locate said requested compressed data segment within said series of compressed data segments in said compressed data memory, and
    retrieve said requested compressed data segment from said compressed data memory; and wherein
  to use said retrieved locator to locate said requested compressed data segment, said controller is further operative to
    determine a sum of the sizes of each of said compressed data segments in said series stored prior to said requested compressed data segment,
    divide said sum by a value equal to a width of each of a plurality of memory locations of said compressed data memory to obtain a quotient and a remainder,
    convert said quotient to a memory address, and
    set an offset equal to said remainder;
  said memory address identifies a memory location of said compressed data memory storing at least part of said requested compressed data segment; and
  said offset indicates the position of a first bit of said requested compressed data segment within said memory location.

\* \* \* \* \*